United States Patent
Crawford et al.

(10) Patent No.: US 10,381,035 B2
(45) Date of Patent: *Aug. 13, 2019

(54) ALL-NANOPARTICLE CONCAVE DIFFRACTION GRATING FABRICATED BY SELF-ASSEMBLY ONTO MAGNETICALLY-RECORDED TEMPLATES

(71) Applicant: UNIVERSITY OF SOUTH CAROLINA, Columbia, SC (US)

(72) Inventors: Thomas M. Crawford, Irmo, SC (US); Longfei Ye, Columbia, SC (US); Jason Ryan Henderson, Taylors, SC (US)

(73) Assignee: University of South Carolina, Columbia, SC (US)

( * ) Notice: Subject to any disclaimer, the term of this patent is extended or adjusted under 35 U.S.C. 154(b) by 683 days.

This patent is subject to a terminal disclaimer.

(21) Appl. No.: 14/251,889

(22) Filed: Apr. 14, 2014

(65) Prior Publication Data

US 2014/0307322 A1 Oct. 16, 2014

Related U.S. Application Data

(60) Provisional application No. 61/811,351, filed on Apr. 12, 2013, provisional application No. 61/811,366, filed on Apr. 12, 2013.

(51) Int. Cl.
*G11B 5/855* (2006.01)
*G02B 5/18* (2006.01)
(Continued)

(52) U.S. Cl.
CPC ............ *G11B 5/855* (2013.01); *G02B 5/1847* (2013.01); *G11B 5/746* (2013.01); *H01F 1/0045* (2013.01);
(Continued)

(58) Field of Classification Search
None
See application file for complete search history.

(56) References Cited

U.S. PATENT DOCUMENTS 4,965,653 A * 10/1990 Otsuka ................... H01L 23/32
257/622
6,451,220 B1 * 9/2002 Ziolo ...................... B82Y 25/00
252/62.54

(Continued)

OTHER PUBLICATIONS

Doumanidis, Charalabos C., "Nanomanufacturing of random branching material architectures", Microelectronic Engineering 86, 2009, p. 467-478.

(Continued)

*Primary Examiner* — Mandy C Louie
(74) *Attorney, Agent, or Firm* — Dority & Manning, PA

(57) ABSTRACT

Methods for magnetic recording are provided. The method can include: assembling a plurality of nanoparticles into a pattern on a disc; applying a polymer composition onto the pattern of nanoparticles; curing the polymer composition to form a polymer film on the disc, wherein the plurality of nanoparticles are immobilized in the pattern within the polymer film upon curing; and removing the polymer film containing the plurality of nanoparticles in the pattern. Diffraction gratings are also provided that can include a polymeric film comprising a plurality of nanoparticles immobilized in a pattern, wherein the polymer film defines a curvature.

16 Claims, 18 Drawing Sheets

(51) Int. Cl.
  *G11B 5/74*   (2006.01)
  *H01F 1/00*   (2006.01)
  *H01F 1/11*   (2006.01)
  *B82Y 25/00*  (2011.01)
  *G11B 5/596*  (2006.01)

(52) U.S. Cl.
  CPC .............. *H01F 1/11* (2013.01); *B82Y 25/00* (2013.01); *G11B 5/59688* (2013.01)

(56) References Cited

U.S. PATENT DOCUMENTS

| | | | | |
|---|---|---|---|---|
| 2006/0246438 | A1* | 11/2006 | McCall | B82Y 5/00 435/6.12 |
| 2007/0224517 | A1* | 9/2007 | Yellen | B81C 1/00031 430/5 |
| 2008/0176109 | A1* | 7/2008 | Kim | G11B 5/855 428/827 |
| 2008/0261044 | A1* | 10/2008 | Lalli | E21B 17/003 428/402 |
| 2008/0311375 | A1* | 12/2008 | Harnack | B01D 67/003 428/315.7 |
| 2010/0133511 | A1* | 6/2010 | Zhou | B82Y 10/00 257/24 |
| 2010/0279024 | A1* | 11/2010 | Crawford | B82Y 25/00 427/508 |
| 2012/0225264 | A1* | 9/2012 | Villwock | B82Y 30/00 428/201 |

OTHER PUBLICATIONS

Grzelczak et al., "Directed Self-Assembly of Nanoparticles", Acs Nano, vol. 4, No. 7, 2010, p. 3591-3605.
Bitter, F., "On inhomogeneities in the magnetization of ferromagnetic materials", Phys. Review, vol. 38, No. 15, 1931, p. 1903-1905.
Porthun et al., "Bitter colloid observations of magnetic structures in perpendicular magnetic recording media", Journal of Magnetism and Magnetic Materials 123, Jan. 1993. p. 199-208.
Takayasu et al., "Magnetic Separation of Submicron Particles", IEEE Transactions of Magnetics, vol. Mag-19, No. 5, Sep. 1983, p. 2112-2114.
Ozdemir et al, "Assembly of magnetic nanoparticles into higher structures patterned magnetic beads under the influence of magnetic field", Nanotechnology 21, 2010, 6 pp.
Park et al., "Highly crystalline anisotropic superstructures via magnetic field Letters induced nanoparticle assembly", Chem. Commun, 47, 2007, p. 5001-5003.
Liu et al., "Self-assembled magnetic nanowire arrays", Applied Physics Letters 90, 2007, 103105-1-103105-3.
Alsberg et al., "Magnetically-Guided Self-Assembly of Fibrin Matrices with Ordered Nano-Scale Structure for Tissue Engineering", Tissue Engineering, vol. 12, No. 11, p. 3247-3256.
Yellen et al., "Programmable Assembly of Colloidal Particles Using Magnetic Microwell Templates", Langmuir 20, 2004, p. 2553-2559.
Sahoo et al., "Field-Directed Self-Assembly of Magnetic Nanoparticles", Phys. Chem. B, 108, Jan. 2004, p. 3380-3383.
Yellen et al., "Printing superparamagnetic colloidal particle arrays on patterned magnetic film", Journal of Applied Physics, vol. 93, No. 10, May 15, 2003, 7331-7333.

Love et al., "Three-Dimensional Self-Assembly of Metallic Rods with Submicron Diameters Using Magnetic Interactions", J. Am. Chem. Soc. 125, Jan. 2003, p. 12696-12697.
Lee et al, "Microelectromagnets for the control of magnetic nanoparticles", Applied Physics Letters, vol. 79, No. 20, Nov. 12, 2001, p. 3308-3310.
Gunnarsson et al., "Programmable Motion and Separation of Single Magnetic Particles on Patterned Magnetic Surfaces", Advanced Materials 17, 2005, 1730-1734.
Helseth et al., "Magnetic structuring and transport of colloids at interfaces", Journal of Magnetism and Magnetic Materials 277, 2004, p. 245-250.
Chang et al., "Self-assembled ferrofluid lithography: patterning micro and nanostructures by controlling magnetic nanoparticles", Nanotechnology 20, 2009, 4 pp.
Nichol et al., "Two-step magnetic self-alignment of folded membranes for 3D nanomanufacturing", Microelectronic Engineering 84, 2007, p. 1168-1171.
Wang et al., *Magnetic Information Storage Technology*. Electromagnetism, Academic Press, San Diego, 1999.
Fontana et al., "E-Beam Writing: A Next-Generation Lithography Approach for Thin-Film Head Critical Features", IEEE Transactions on Magnetics, vol. 38, No. 1. Jan. 2002, p. 95-100.
Wood, Roger, "The Feasibility of Magnetic Recording at 1 Terabit per Square Inch", IEEE Transactions on Magnetics, vol. 36, No. 1, Jan. 2000, p. 36-42.
Lim et al., "Optical imaging and magnetophoresis of nanorods", Journal of Magnetism and Magnetic Materials 321, 2009, p. 1557-1562.
Furlani, E.P., "Analysis of particle transport in a magnetophoretic microsystem", Journal of Applied Physics 99, 2006, 024912-1-024912-11.
Henderson et al., "Repeatability of magnetic-field driven self-assembly of magnetic nanoparticles", Journal of Applied Physics 109, 2011, 07D329-1-07D329-3.
Fragouli et al., "Dynamical Formation of Spatially Localized Arrays of Aligned Nanowires in Plastic Films with Magnetic Anisotropy", Acs Nano, vol. 4, No. 4, 2010, p. 1873-1878.
Martin et al., "Anisotropic magnetism in field-structured composites", Physical Review E, vol. 61, No. 3, Mar. 2000, p. 2818-2830.
Leonhardt et al., "Comparison of Perpendicular and Longitudinal Magnetic Recording Using a Contact Write/Read Tester", IEEE Transactions on Magnetics, vol. 37, No. 4, Jul. 2001, p. 1580-1582.
Erb et al., "Magnetic assembly of colloidal superstructures with multipole symmetry", Nature, vol. 457, Feb. 19, 2009, p. 999-1002.
Samanta et al, "Protein-passivated $Fe_3O_4$ nanoparticles: low toxicity and rapid heating for thermal therapy", J. Mater. Chem. 18, 2008, p. 1204-1208.
Goff et al., "Novel Phosphonate-Functional Poly(ethylene oxide)-Magnetite Nanoparticles Form Stable Colloidal Dispersions in Phosphate-Buffered Saline", Chem. Mater. 21, 2009, p. 4784-4795.
Miles et al., "Synthesis and Colloidal Properties of Polyether-Magnetite Complexes in Water and Phosphate-Buffered Saline", Langmuir 25, 2009, p. 803-813.
Rice et al, "Magnetic Imaging Reference Sample", IEEE Transactions on Magnetics, vol. 32, No. 5, Sep. 1996, p. 4133-4137.
Yellen et al., "Arranging matter by magnetic nanoparticle assemblers", P. Natl Acad. Sci. vol. 102, No. 25, Jun. 2005, p. 8860-8864.
Erb et al., "Magnetic field induced concentration gradients in magnetic nanoparticle suspensions: Theory and experiment", Journal of Applied Physics 103. 2008, p. 063916-1-063916-5.

* cited by examiner

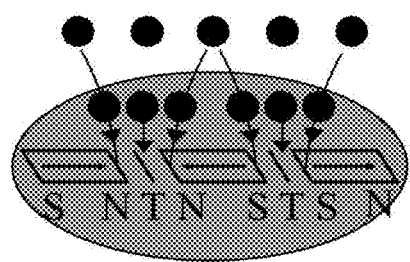
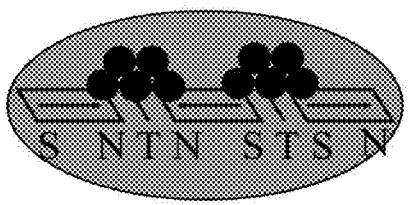
*Fig. 5A*          *Fig. 5B*
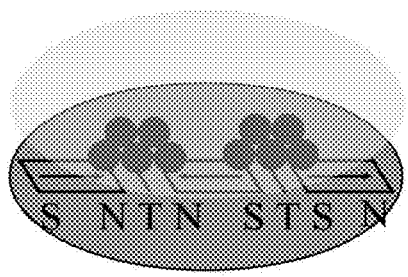
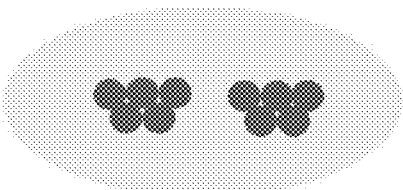
*Fig. 5C*          *Fig. 5D*

$\lambda(nm)$

ALL-NANOPARTICLE CONCAVE DIFFRACTION GRATING FABRICATED BY SELF-ASSEMBLY ONTO MAGNETICALLY-RECORDED TEMPLATES

PRIORITY INFORMATION

The present application claims priority to U.S. Provisional Patent Application Ser. No. 61/811,351 titled "Pattern Transfer Nanomanufacturing Using Magnetic Recording for Programmed Nanoparticle Assembly" of Thomas Crawford filed on Apr. 12, 2013 and to U.S. Provisional Patent Application Ser. No. 61/811,366 titled "All-Nanoparticle Concave Diffraction Grating Fabricated by Self-Assembly onto Magnetically-Recorded Templates" of Thomas Crawford filed on Apr. 12, 2013; the disclosures of which are incorporated by reference herein.

BACKGROUND

The goal of nanomanufacturing is to develop practical methods for leveraging novel properties inherent in nanomaterials to yield viable new technologies. Realizing a practical and scalable platform for nanomanufacturing macroscopic materials and architectures via bottom-up self or directed assembly is a critical aspect of current nanotechnology research. In particular, reprogrammable mechanisms for assembling and then transferring large area nanomaterial assemblies into application platforms are needed, where the "raw" material is a nanoparticle or similar nanoscale material, and the finished product is a designed, macroscopic structure built from the raw materials. One approach to nanomaterials assembly uses external electromagnetic forces to position and assemble arrays of nanoparticles. Here, magnetic-gradient force directed assembly was originally employed by Bitter to visualize domains and surface features in magnetic materials. This "Bitter technique" has been applied for imaging the patterns created by magnetic recording on disk drive media, and for separating weakly magnetic and nonmagnetic particles through high gradient magnetic separation (HGMS). More recently, lithographed arrays of magnetic materials biased with external magnetic fields have been used to assemble magnetic particles in a fluidic environment, yielding techniques for particle transport for drug delivery, masking for lithography, and stitched membrane assembly.

Hard disk drives using magnetic recording technology store much of the world's information on Cobalt alloy magnetic media with grain sizes less than 10 nm in diameter, bit lengths in the 30 nm range, and track widths less than 100 nm, i.e. at significantly smaller length scales than the lithographed structures described above. Driven by explosive growth in the market for storage capacity over the past decade, the disk drive industry has leveraged giant magnetoresistance (GMR), advanced materials, and scalability to drive the core technologies to nanoscale dimensions, and in terms of required critical dimensions for lithography, the data storage roadmap closely matches the semiconductor industry. Presently, the industry is aiming toward a 1 Terabit/ $in^2$ areal density target where bit lengths and track widths will be 11 nm and 38 nm, respectively.

Enormous magnetic field gradients exist at recorded magnetization transitions in disk drive media, suggesting the application of magnetically recorded transitions for local magnetophoresis. From the conventional expressions describing the magnetic field of recorded transitions in disk media, it is found that the magnetic field gradient ranges from $>4 \times 10^6$ T/m at 25 nm to $\sim 5000$ T/m at 1 µm above the surface. These field gradients are significantly higher than the $\leq 1000$ T/m gradients typically employed in external field-driven magnetophoresis. At 50 nm above the disk surface, the work done by this field gradient to move a 10 nm diameter nanoparticle (partially magnetized by the medium field at this height) one diameter toward the surface exceeds kBT, meaning that the magnetic gradient force will dominate over other transport mechanisms at this height for approximately 10 nm and larger nanoparticles. Therefore, these gradients allow for precision assembly of ferrite nanoparticles into large area patterns, and we have previously employed AFM to determine a coating-to-coating repeatability for this process of 27±11 nm.

Diffraction gratings consisting of a large number of equally spaced parallel slits or grooves play an important role in many technologies, including spectroscopy, laser systems, and information communication, where, for example, gratings increase the capacity of fiber-optic networks using wavelength divisionmultiplexing/demultiplexing. High-resolution commercial diffraction gratings were originally fabricated with ruling engines, and the ruling process is slow and requires precise control of mechanical motion and external vibration. Other fabrication methods include photographic recording of a stationary interference fringe field in photoresist to create a holographic grating, electron beam lithography, and focused ion beam etching. Recently, gratings have been fabricated using laser pulses to ablate metal nanoparticles or thin films, with interference to create the grating pattern. Given the evolving need for control over optical element fabrication, lower cost and sustainable manufacturing technologies with nanometer precision are needed to create novel optical materials, and maintain the pace of technological innovation in optical technologies.

Nanoparticle self-assembly has promise as a sustainable manufacturing technology for construction of complex patterns including linear chains, and close packed arrays. For optical applications, self-assembly has been used to create dynamic diffraction gratings in liquid from colloidal nanoparticles using electrophoresis. Similarly, self-assembly via DNA and other surface anchoring techniques has been employed to pattern diffraction gratings on surfaces.

SUMMARY

Objects and advantages of the invention will be set forth in part in the following description, or may be obvious from the description, or may be learned through practice of the invention.

Methods are generally provided for magnetic recording. In one embodiment, the method includes: assembling a plurality of nanoparticles into a pattern on a disc; applying a polymer composition onto the pattern of nanoparticles; curing the polymer composition to form a polymer film on the disc, wherein the plurality of nanoparticles are immobilized in the pattern within the polymer film upon curing; and removing the polymer film containing the plurality of nanoparticles in the pattern.

Diffraction gratings are also generally provided. In one embodiment, the diffraction grating includes a polymeric film comprising a plurality of nanoparticles immobilized in a pattern, wherein the polymer film defines a curvature.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

In FIG. 4A, the lower layer includes magnetic nanoparticles (directly above magnetic transitions) are assembled in a upward-directed external field (Hext=800 Oe) and spin-coated with polymer (here the 'particles' correspond to bright marks in the dark-field image (lower panel, left). Note the magnetic field was not strong enough in this case to completely prevent assembly on the opposite transition, which appear as relatively darker, interleaved features between the bright features in the image.

In FIG. 4B, a second layer of nanoparticles (on top of the polymer film in the upper right panel schematic) are assembled in a downward directed external field (Hext=800 Oe) on top of the polymer film that covers the first layer of nanoparticles. In this dark field image (lower panel, right), the upper nanoparticle layer is now slightly brighter than the spatially-offset lower nanoparticle layer (see callout). The lower right image is somewhat blurry because the microscope is focusing through two layers of polymer film.

FIG. 5A-5G show a diffraction grating nanomanufacturing using programmable magnetic recording and resulting pattern transfer. FIG. 5A-5D are a schematic diagrams showing an exemplary sequential nanomanufacturing process. Here, the gray ellipses represent projections of coupons; the parallelograms represent projections of magnetized regions on coupons and arrows enclosed denote magnetization directions; T represents magnetic transition; the black dots represent superparamagnetic nanoparticles; the light ellipses (FIGS. 5C and 5D) represent projections of polymer thin films. FIG. 5E shows a Dark-field optical image of nanoparticle arrays assembled on a coupon. FIG. 5F shows a polymer film containing patterned nanoparticles after peeling. FIG. 5G shows a Dark-field optical image of the black square in FIG. 5F showing the assembled nanoparticle grating lines embedded in the polymer film.

FIG. 6A shows in the left panel a schematic diagram of polymer diffraction grating (DG) in front view and in the right panel a schematic diagram of the measurement apparatus in top view. As shown, light illuminates DG center (O) at normal incidence and diffraction spectra are recorded using a line camera (LC) in reflection mode. Red (green and blue) solid lines depict the diffracted red (green and blue) beam. FIG. 6B shows diffraction spectra of 405 nm, 532 nm and 632 nm lasers that are used to calibrate the diffraction grating spectrum (LC is at x=4.0 mm and y=13.7 mm). The top axis denotes LC pixel positions, and bottom axis calibrated to yield wavelength in nm. FIG. 6C shows in the solid line a diffraction spectrum for a tungsten-halogen bulb measured with a 1.1 mm thick grating, and in the dotted line a diffraction spectrum for the tungsten-halogen bulb measured with a commercial spectrometer. The inset in FIG. 6C is a photograph of tungsten-halogen spectrum measured with the 1.1 mm thick grating.

FIG. 7A shows a 532 nm diffraction spectra recorded while translating the LC in the y direction demonstrate changes in both peak intensity x-position (bottom axis) and width (corresponding y positions in millimeters are shown above each peak). FIG. 7B shows a schematic diagram of an optical system showing image formation with a concave grating. FIG. 7C shows a red (left line), green (middle line) and blue dots (right light) (crosses and triangles) show focal positions for 632 nm, 532 nm and 405 nm lasers respectively. Polymer film thicknesses are indicated in the legend. Three solid lines show fitted trajectories of focal positions for the three grating thicknesses with fitted radii of curvature, R, as indicated. Red (left line), green (middle line) and blue dots (right light) dashed lines display linear fits of diffraction angles for the 632, 532, and 405 nm lasers. Inset: R vs grating thickness.

FIG. 8A shows the tungsten-halogen spectra obtained from 5 nominally identical 1.1 mm thick concave gratings. All spectra have 5 peaks and show similar spectral peak positions, demonstrating the high repeatability of tungstenhalogen spectra. FIGS. 8B-8F each show a 10 nm peak-peak dot plot showing fitted peak positions for 5 gratings, demonstrating 3 nm average standard deviation.

DEFINITIONS

Figure 1A:
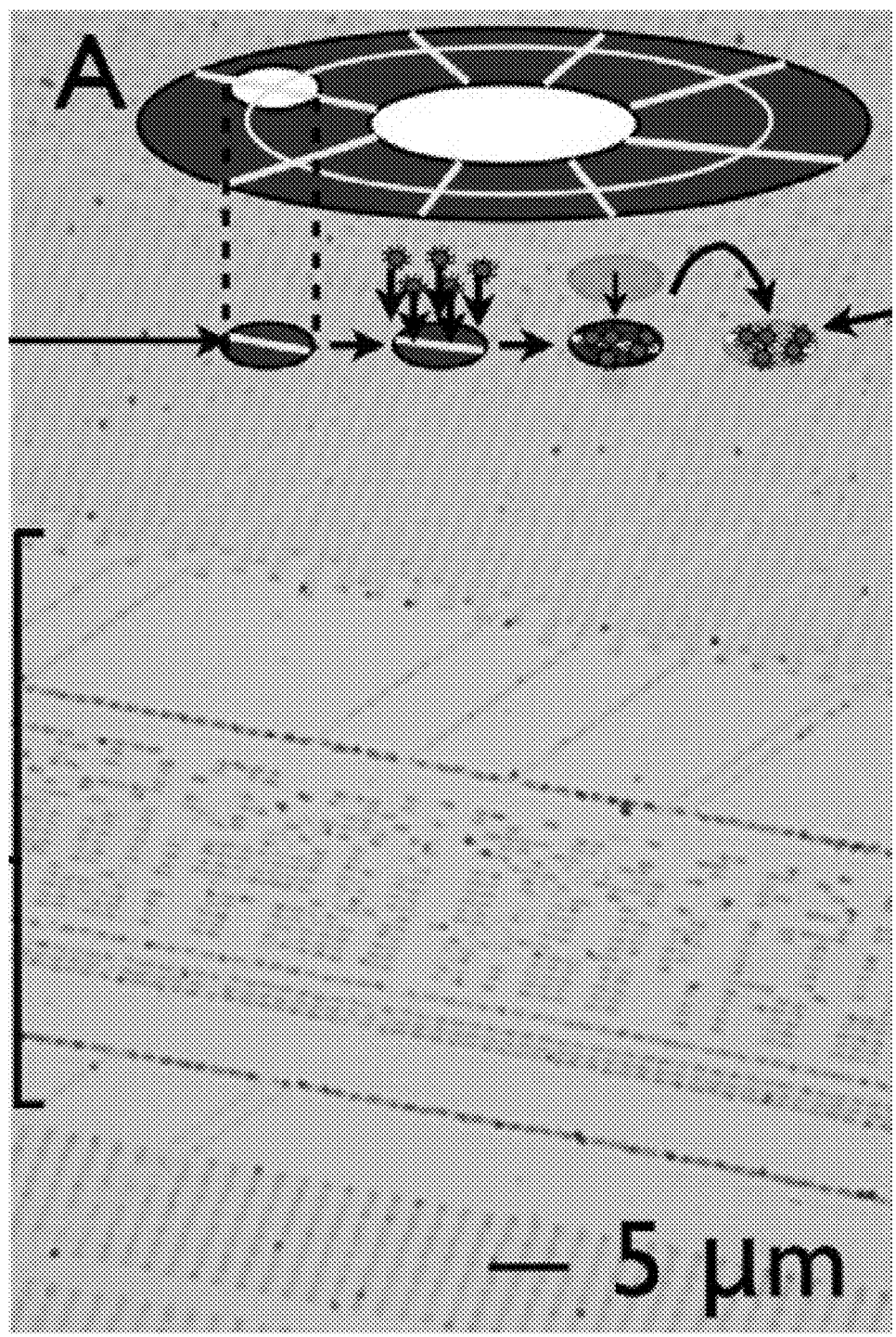
FIG. 1A shows a bright field optical image of servo sector region of disk drive media after coating the disk surface with magnetic nanoparticles, with the inset being an overview of an exemplary nanomanufacturing process depicting sequentially: a coupon being removed from the disk with the radial servo region along the coupon diameter; nanoparticles being attracted to the transitions on the coupon; after assembly, a thin polymer film being coated on the coupon and then peeled to yield a nanomanufactured material.
Figure 1B:
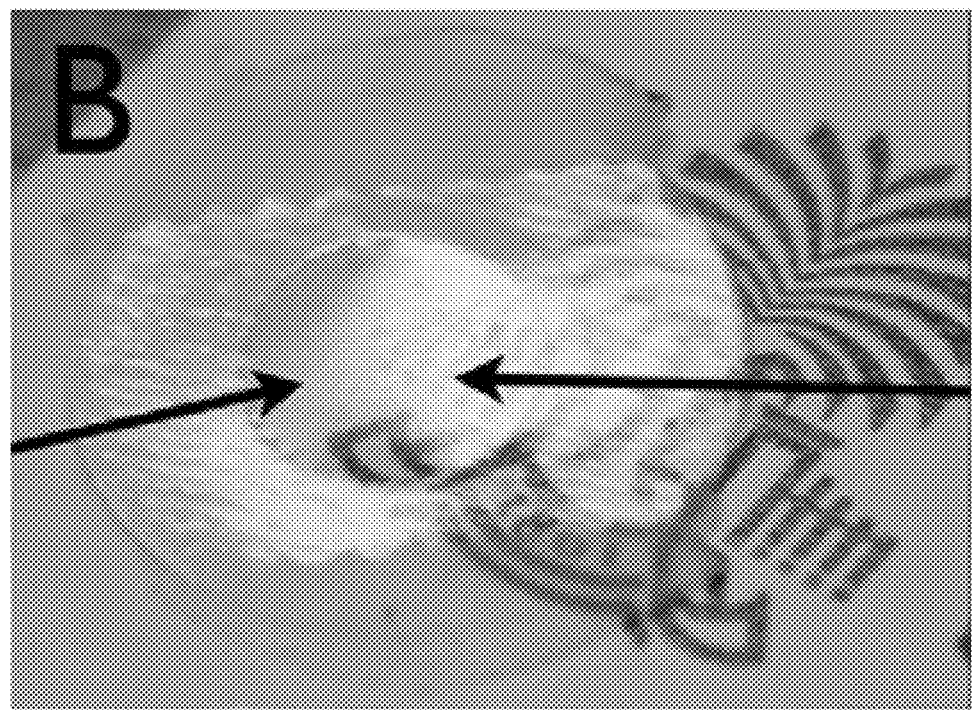
FIG. 1B showing a transparent film containing patterned nanoparticles after peeling from the disk media surface.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 µm) are generally referred to as "microparticles", since the micrometer scale generally involves those materials having an average size of greater than 1 µm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.).

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for a magnetic recording "nanotechnology" for nanomanufacturing. Generally, after the particles have been assembled and the remaining colloid removed, a polymer coating and peeling process is performed that transfers the nanoparticles from the disk medium surface to a flexible, transparent film while maintaining the magnetically-recorded nanomaterial pattern. Thus, the disk drive's spatial resolution (e.g., about 10 nm spatial resolution) and ability to pattern large surface areas with precisely-controlled fluidic deposition are combined to create complex assemblies, employing individual nanoparticles in a colloidal solution as "raw materials."

For example, the enormous magnetic field gradients present near the surface of magnetic recording media can be used to assemble diffraction gratings with lines that are entirely composed of self-assembled magnetic nanoparticles, which can then be transferred to flexible polymer thin films as discussed above. These nanomanufactured gratings have line spacings programmed with commercial magnetic recording and are inherently concave with radii of curvature controlled by varying the polymer film thickness. This manufacturing approach offers a low-cost alternative for realizing concave gratings and more complex optical materials assembled with single-nanometer precision.

EXAMPLE 1

Nanomanufacturing Process

A novel nanomanufacturing technique is generally provided that incorporates patterned arrays built entirely from $Fe_3O_4$ nanoparticles into a flexible and transparent polymer film. First, the nanoparticles are patterned using the enormous magnetic field gradients at the surface of commercial disk drive media, and then the resulting architecture is transferred to the surface of a polymer film by spin-coating and peeling. Since the particles are immobilized by the field gradients during the spin-coating process, the patterned array is preserved after peeling. To demonstrate the potential of this technology, we fabricated a 5 mm diameter all-nanoparticle diffraction grating capable of producing a white-light optical spectrum. We also demonstrate several extensions to this technology, where, by adding an external magnetic field during assembly, we created both periodic variations in topography, as well as a nanocomposite with two vertically and horizontally separated nanoparticle layers. As this technique leverages the nanometer resolution inherent in current magnetic recording technology, strong potential exists for low-cost nanomanufacturing of optical and electronic devices from a variety of nanomaterials with about 10 nm resolution.

FIG. 1(A-D) gives a pictorial overview of our nanomanufacturing process, with the inset of FIG. 1(A) outlining the entire process schematically. We employ pre-recorded, longitudinal magnetic recording media, using~1 cm circular coupons cut from commercial recording "disks" as the assembly substrate (FIG. 1A-inset). The thin film magnetic media are grown on Al substrates and have magnetizations of~450 kA/m, as determined using Vibrating Sample Magnetometry (VSM) on a Quantum Design Physical Property Measurement System (PPMS). Commercial disk drive media are patterned into sectors along the circumference of the disk prior to distribution through a process called servo-writing, which creates regions known as servo sectors between the data sectors. These regions have magnetic field patterns which are used with a servo-algorithm to keep the recording heads accurately positioned over the data tracks. FIG. 1(A) shows both data and servo-patterned regions of the medium, with the servo sector comprising the varying width marks running diagonally from the left center to the lower right corner of FIG. 1(A). In addition to using pre-written regions of media for nanoparticle assembly, we employ a contact recording tester to magnetically-record desired transition patterns into the medium. A contact tester is a scanning probe tool that scans a magnetic recording head with nanometer precision while in contact with disk media, with electrical connections to the recording head providing for both programmed precision magnetic recording and transition field imaging with the GMR readback head. FIG. 1(A) shows 7 tracks written with our contact tester at different spacing offsets across the servo and data regions from the lower left to middle/upper right of the image. Each transition recorded into the medium emits a magnetic field into the space above the transition, with magnetic field lines directed to adjacent, oppositely magnetized transitions. These rapidly changing field lines create a large and spatially-localized magnetic field gradient as described in the appendix.

Nanoparticle Deposition onto Disk Media

We employ commercial (Ferrotec, Nashua, NH—EMG-707) and in-house synthesized ferrofluid to create these assemblies on our disk coupons. First, the coupons are sonicated in Perfluorosolv Fomblin (PFS-1 flushing fluid—Solvay Solexis, West Deptford, N.J.) for 15-30 seconds to remove the hydrocarbon lubricant from the disk surface. Ferrofluid is diluted to~0.01-0.05% of the stock solution in>1017 Ohm deionized water and deposited onto the coupons in a liquid cell (radius 7.5 mm) and covered to a depth of 3 mm. The superparamagnetic nanoparticles that are suspended in the ferrofluid just above the disk surface are magnetized by the transitions' magnetic field, and are then attracted to the transitions by the field gradient, which is largest at the surface of the medium and at the location of the transition. After several minutes, phosphate buffer (pH 7.2, VWR, Inc.) is added to the liquid cell to modify the electrostatically-charged ligand on the nanoparticle surface that typically stabilize a colloidal solution. This step is critical for keeping the nanoparticles in place on the disk surface as the remaining ferrofluid solution is pumped away with a peristaltic pump. Samples which were not treated with buffer solution typically do not yield a complete coating of ferrofluid on the disk surface, while treated samples are stable and easily imaged with an optical microscope. Bright and dark-field optical images of the coated disk surfaces are obtained using a Nikon instruments LV-200 microscope equipped with a Canon digital SLR.

Nanoparticle Pattern Transfer to Flexible, Polymer Film

Figure 1C:
FIG. 1C showing the white-light diffraction in reflection mode from a film-like that shown in FIG. 1B containing particles assembled using the process of FIG. 1A to produce.
Figure 1D:
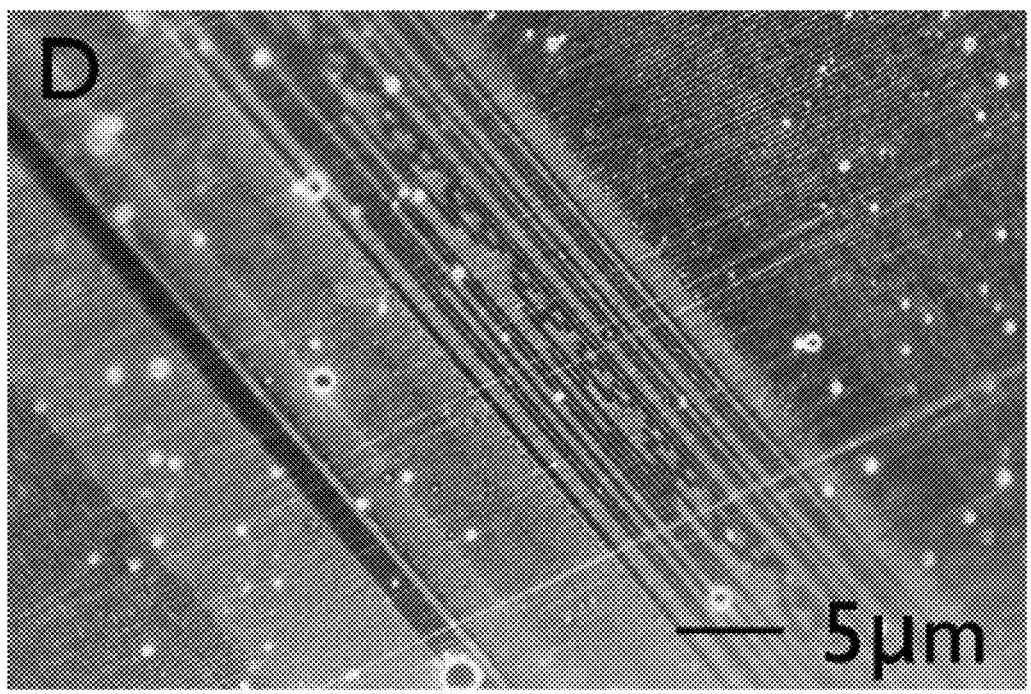
FIG. 1D showing a dark-field optical image of peeled film showing arrayed nanoparticles.

After imaging the nanoparticles assembled on the disk drive surface, the coupon is spin-coated with a liquid polymer (Diskcoat 4220—General Chemical Co., Brighton, Mich.). Undiluted Diskcoat spun at 2600 rpm for 30 seconds yields a~200 nm thick film, as determined using both stylus and optical profilometry. After curing for 15-30 minutes in air at room temperature, the polymer-nanoparticle assembly is peeled from the medium with adhesive tape to yield a suspended film over a 5 mm diameter circular window (arrows in FIG. 1(B)). By adjusting the spin speed, spin time, and by diluting the Diskcoat in DI water, a variety of polymer thicknesses can be obtained, ranging from 100 nm to several μm. However, we found that only films thicker than 200 nm yield an intact film after peeling, and the films discussed here have thicknesses that range from 200-500 nm. These nanomanufactured materials are flexible, transparent, and contain programmed arrays of nanoparticles. FIG. 1(C) shows a reflection optical diffraction spectrum created by sending collimated white light through the assembled nanoparticle layer in the central 5 mm region in FIG. 1(B). FIG. 1(D) also shows that the polymer film itself is not completely defect free, with some unpatterned bubbles remaining in the polymer layer after curing. However, these random defects do not contribute to the diffracted spectrum, as there is no spectrum visible from peeled films without nanoparticles. The peeled films are generally stable, but can be made to repeatably change shape in response to a temporary increase in humidity/temperature (i.e. by breathing on the polymer film), as observed by distortion in a reflected white light spot that returns to a non-distorted shape when the environment returns to ambient.

In addition to optically imaging the nanoparticle-containing polymer films (FIG. 1D), we load them into the VSM and determine their magnetic state. As expected for superparamagnetic nanoparticles, our peeled films show zero remanent magnetization, meaning that the assembled arrays do not remain magnetized without an applied magnetic field. Visual inspection of the coupon surface after peeling shows no remaining nanoparticles, and AFM measurements of coupons after peeling likewise show no particles in several locally-imaged regions. After the initial film peel, second and third films were deposited, cured, and peeled. VSM measurements of these subsequent films are indistinguishable from measurements of films that do not contain nanoparticles. Our VSM's rms sensitivity~1×10−6 emu is~2% of the total moment measured from first-peel films that contain the patterned, transferred nanoparticles. These observations suggest that at minimum 98% of the nanoparticles are transferred to the film during the initial peeling step.

Nanomanufacturing Process Metrology

Atomic and Magnetic Force Microscopy (AFM/MFM) images of nanoparticles both on the disk surface and as embedded in the polymer were obtained with an Agilent PicoPlus SPM operating in non-contact (AC) mode. For AFM, we employed BudgetSensors Tap300 300 kHz tips having 40 N/m force constants and<10 nm tip radius for AFM, while for MFM we used 75 kHz High Resolution MFM tips with<25 nm radius, coated with Co alloy and Al on the backside of the cantilever (Nanoscan Ltd., Dubendorf, Switzerland). To study the repeatability and aid in AFM imaging of assembled nanoparticles, we used optical photolithography to place a series of numbered frames on top of the disk coupon. These 30 nm thick Cu frames were sputter-deposited onto patterned photoresist followed by lift-off, and enable us to find the same exact region of the disk with our AFM to study the assembled pattern as a function of coating process for repeatability and thickness testing. FIG. 2(A-D) show a series of images of the servo marks on a coupon taken with (A) MFM, (B) Dark-field microscopy, (C) AFM of the coupon surface after assembly, and (D) AFM of the peeled film. FIG. 2(A-C) demonstrate that the nanoparticle assembly (imaged both optically and with AFM) closely matches the magnetic force gradients as imaged with MFM. Further, FIG. 2(C-D) shows that the nanoparticles maintain their pattern after transfer to the polymer film. The striations observed in FIG. 2(C-D) are~10 nm high polishing marks left from the disk manufacturing process, and since they do not change from coating to coating, make an excellent reference for image correlation to determine the repeatability of our assembly process, which is presently 27±11 nm. FIGS. 1-2 demonstrate our nanomanufacturing process along with a metrology for assessing repeatability of repeated coatings, before and after transfer to the polymer film.

Measurement of a 50 μm long section of the regular pattern that creates the spectrum in FIG. 1(C) yields 66 lines of nanoparticles as assembled on the disk media, but the same 50 μm scale bar yields 68 lines of nanoparticles on the polymer film (1360 lines per mm). Assuming equal spacing for these features, the nanoparticle line spacing decreases from 760 nm on the coupon to 735 nm in the polymer after peeling (the equal spacing assumption enables us to measure a 25 nm difference per line that is significantly smaller than our actual optical resolution). A similar analysis on the features in FIG. 2(C-D) suggests that the 1.2 μm feature spacing decreases by~50-100 nm after transfer to the polymer film. Therefore, the net result is that the nanoparticle pattern shrinks by~5%. Even though the polymer may expand during curing, we expect the nanoparticles at the surface will remain fixed by the magnetic force, and thus when the polymer relaxes after peeling, the nanoparticle feature spacing decreases slightly.

EXAMPLE 2

Nanomanufacturing Process Extensions using External Magnetic Field

Controlling Intra-Layer Assembly

Figure 2A:
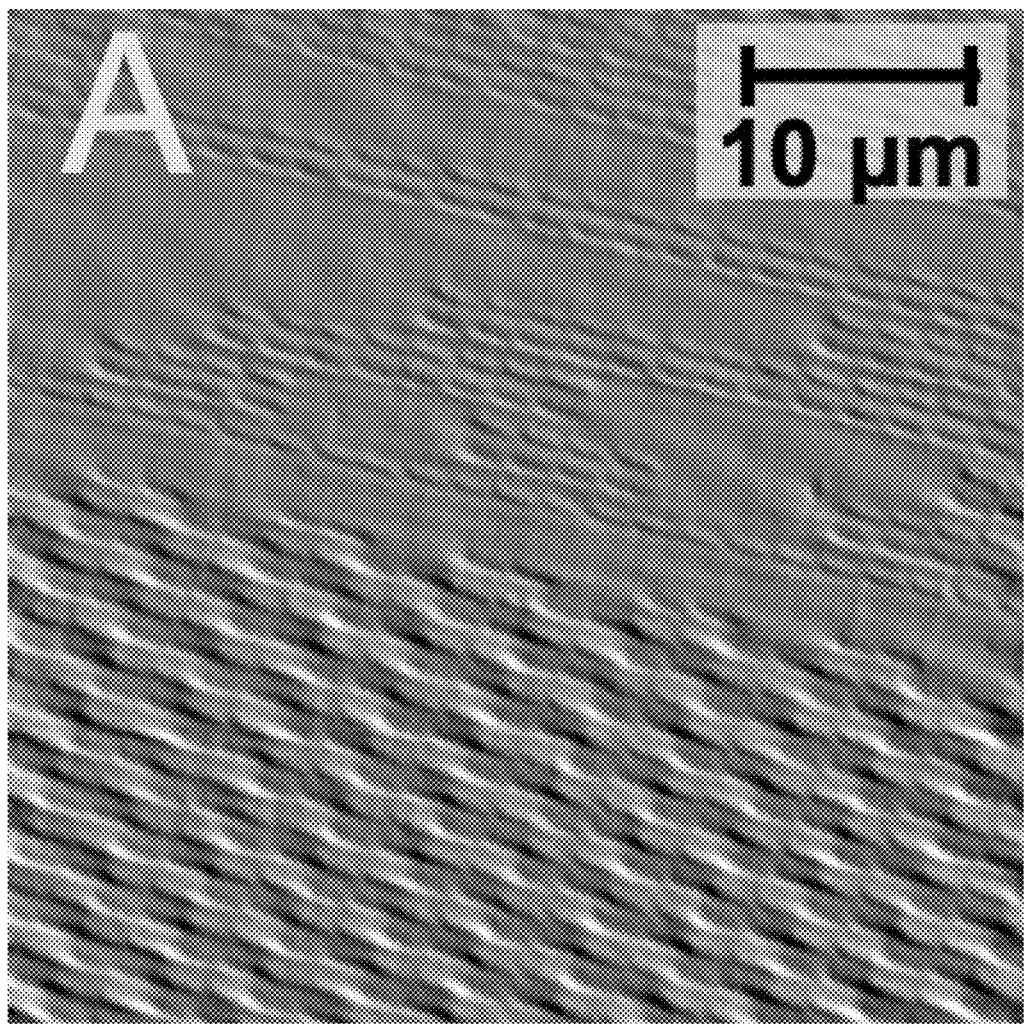
FIG. 2A shows an image of assembled nanoparticles in the form of a Magnetic Force Microscopy (MFM) of patterned bits.
Figure 2B:
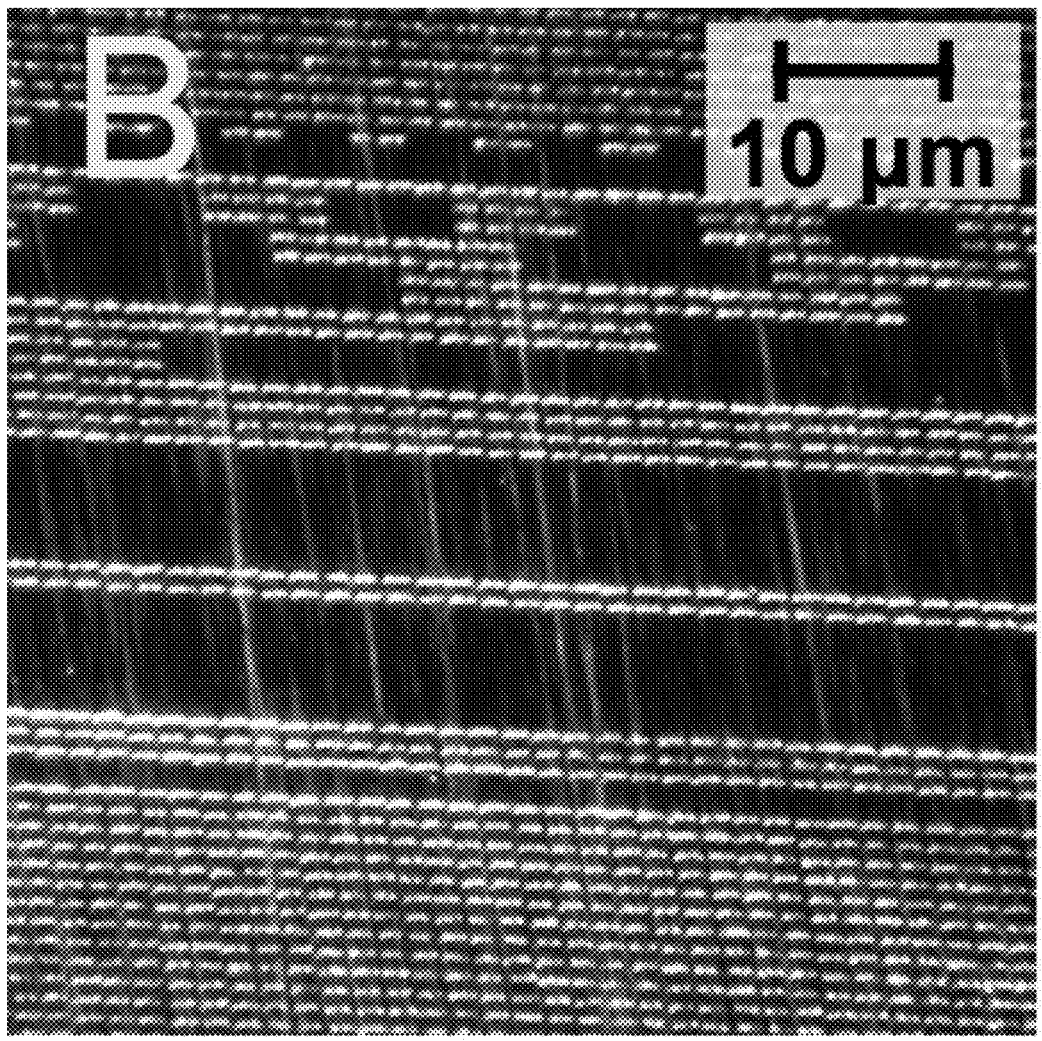
FIG. 2B shows an image of assembled nanoparticles in the form of a dark field optical image of the same feature as in FIG. 2A.
Figure 2C:
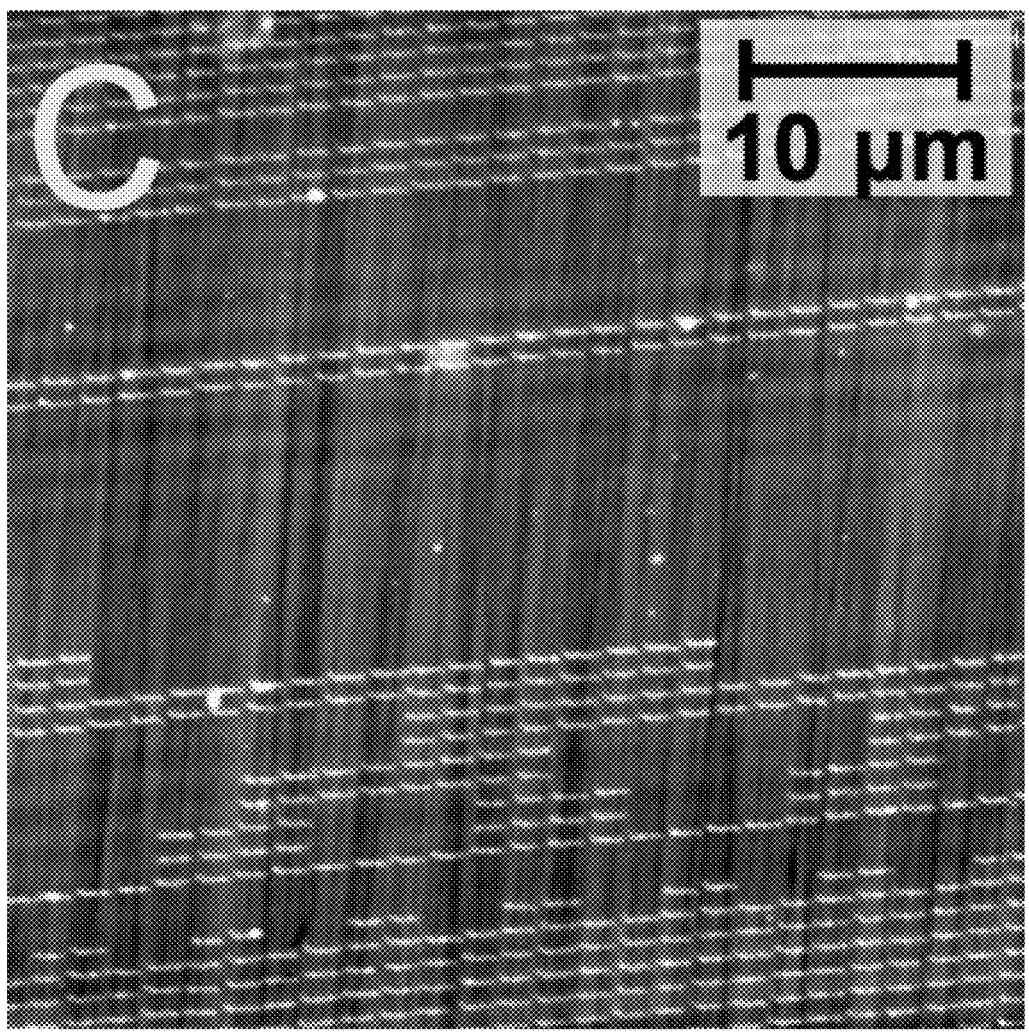
FIG. 2C shows an image of assembled nanoparticles in the form of an Atomic Force Microscopy (AFM) image of the same region as in FIGS. 2A and 2B. Note the polishing striations from the underlying medium substrate which are clearly observed with AFM.
Figure 2D:
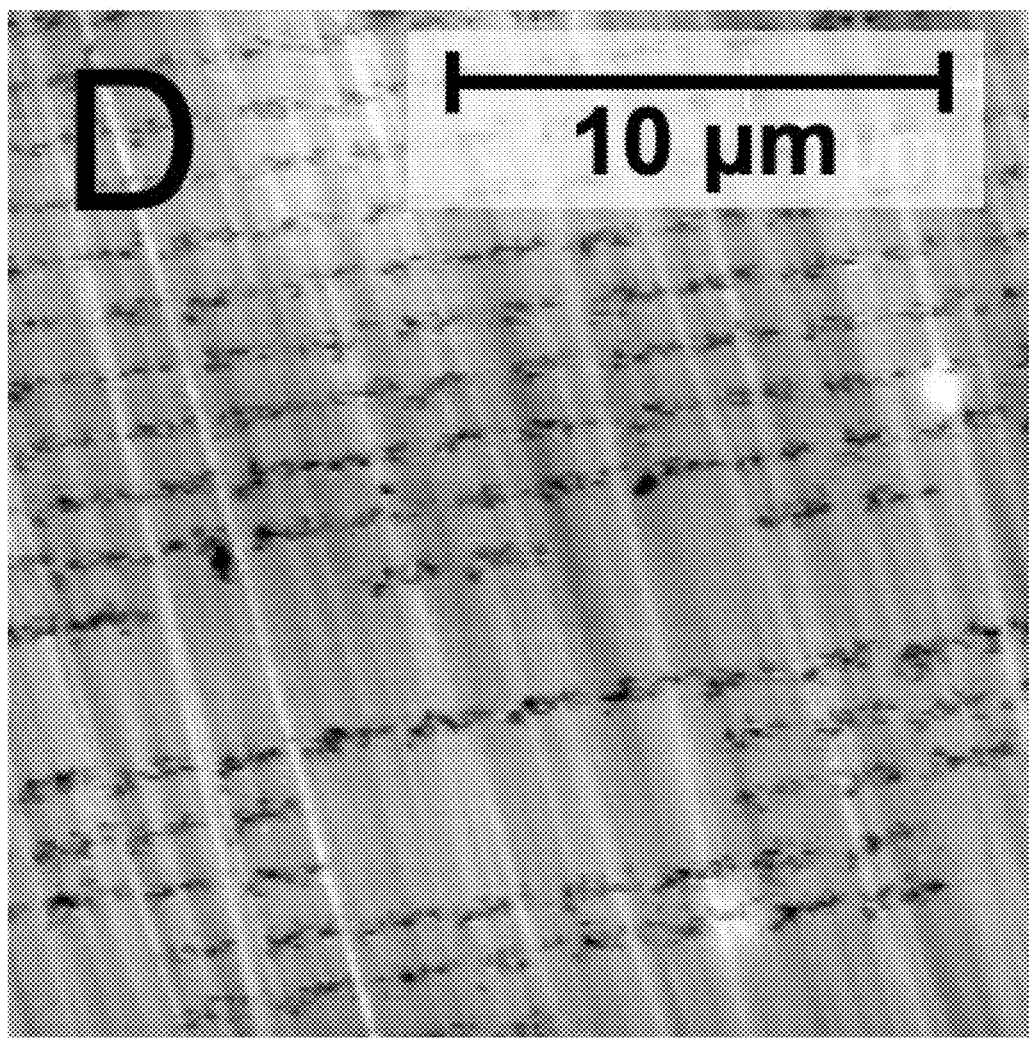
FIG. 2D shows an image of assembled nanoparticles in the form of an AFM image of the same pattern in the peeled polymer film, also containing the polishing striations from the disk substrate.
Figure 3A:
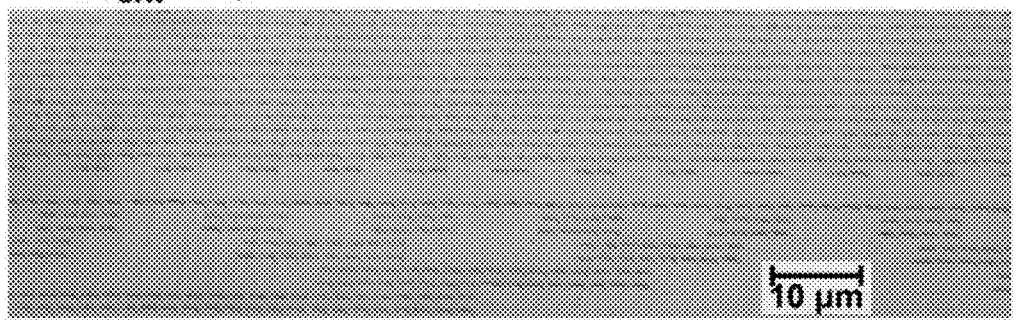
FIG. 3A shows a dark field optical image of disk media servo pattern coated without an external field. Here every transition magnetizes and then attracts nanoparticles.
Figure 3B:
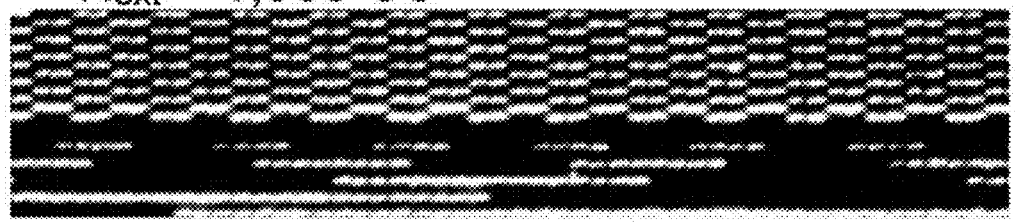
FIG. 3B shows a dark field optical image of the same disk region as (A), only coated in a 1.5 kOe external field (directed toward the surface). Note the staggered pattern in the upper section, and the gaps that have opened up in the rectangular block regions. At 1.5 kOe, the superposition of the alternating upward-directed transition and external field yields Hnet=0 at a height of~20 nm above the disk surface, and nanoparticles above this height are magnetized in the direction of the external field (which exceeds the transition field for z>20 nm). Particles magnetized by the external field should therefore be repelled from every other transition, and a comparison of panels (A) and (B) confirms that while all the transitions are coated in zero field(A), only half are coated in H=1.5 kOe (B).
Figure 4A:
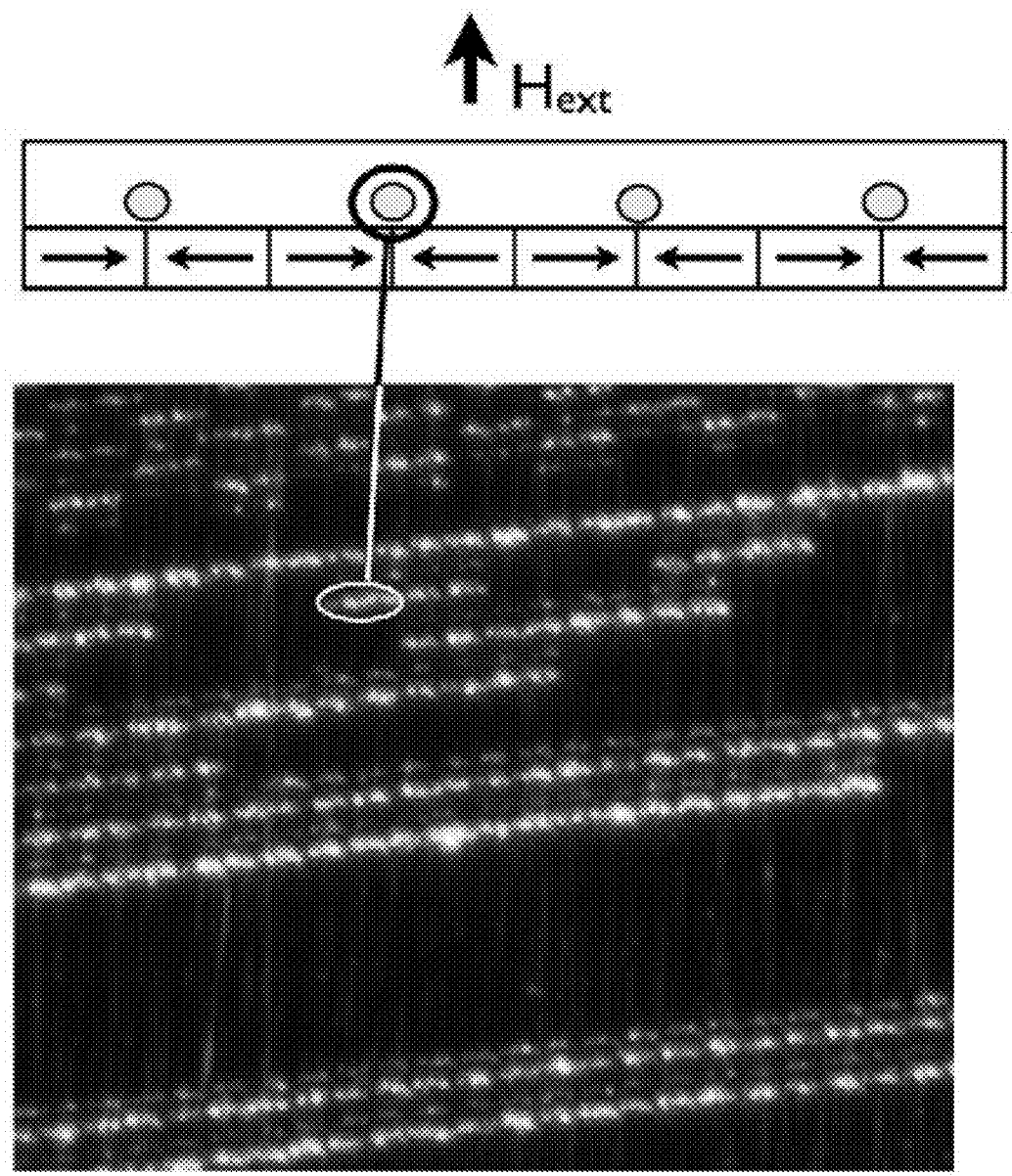
FIG. 4A shows a schematic (top) and experimental demonstration (bottom) of an exemplary directed assembly to nanomanufacture a patterned two-layer composite material.
Figure 4B:
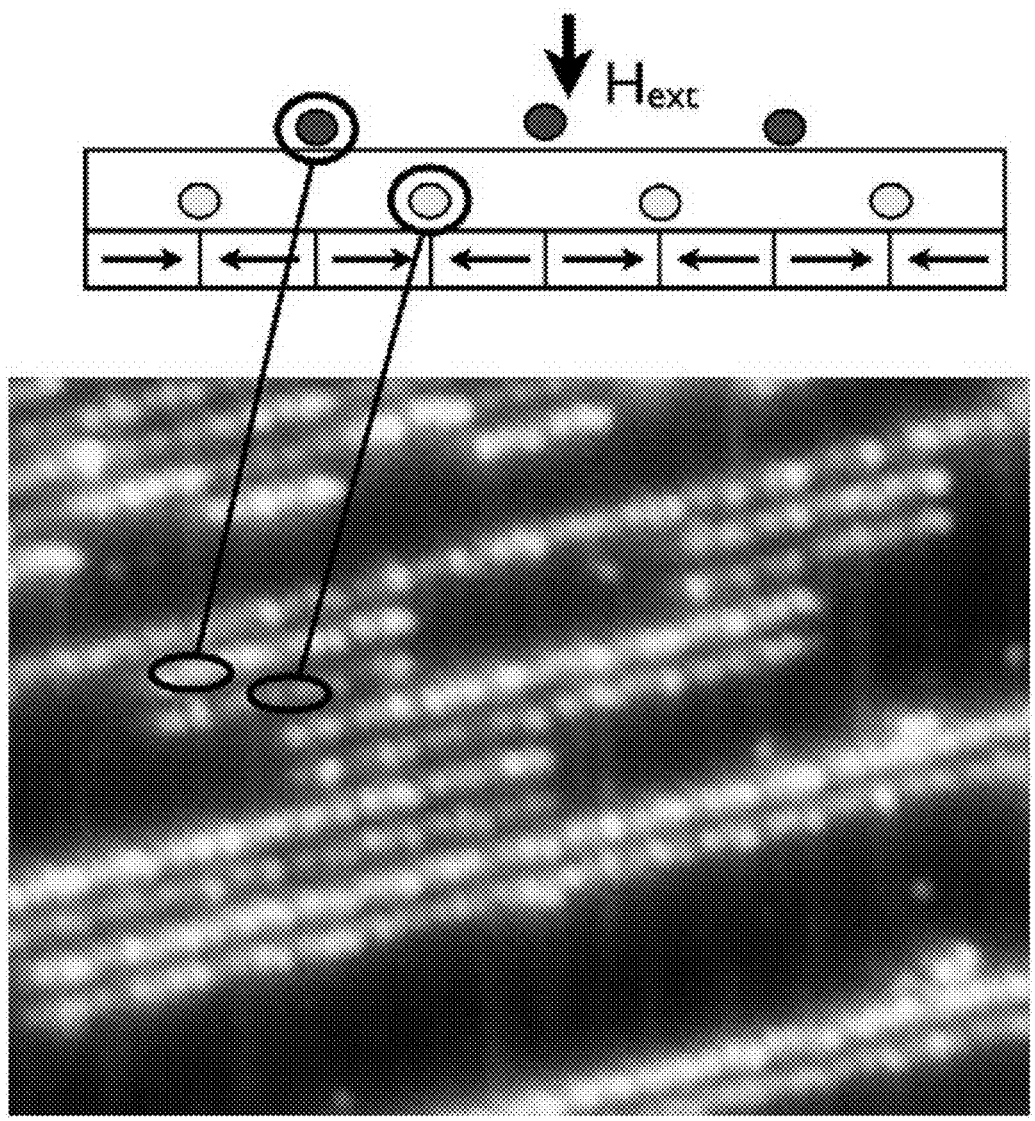
FIG. 4B shows a schematic (top) and experimental demonstration (bottom) of an exemplary directed assembly to nanomanufacture a patterned two-layer composite material.

FIG. 2A and 2C demonstrate that the nanoparticle topography correlates precisely with the magnetic field spatial variation. We can further control the nanoparticle assembly process by applying a uniform external field over the fluid cell during assembly. FIG. 3(A-B) show optical images of the same region of media coated in zero external field (A) and with an external field, Hext=1.5 kOe, directed toward the medium surface (B). In contrast to the zero field assembly process, the superposition of this 1.5 kOe field with the transition field (calculated from the equations in the Appendix) yields Hnet=0~20 nm above the surface. Therefore, the external field will exceed the medium field for z>20 nm and magnetize the nanoparticles along the external field direction. These pre-magnetized nanoparticles will therefore be repelled from transitions with oppositely directed local field (with H=0 at z=20 nm), while still being attracted to transitions whose local field constructively superposes with the external field. Thus in FIG. 3(A) every transition is coated, while in (B) only every-other transition is coated. Close inspection of FIG. 3 shows the similarities in the features between the two images, with spatially modulated features in the upper part of (B) that were horizontal lines in the upper part of (A), and gaps in (A)'s enclosed block-like open spaces appearing in (B). Generally, there are half as many coated features in (B) as in (A). These changes from (A) to (B) are all caused the repulsion of pre-magnetized particles from opposing, spatially alternating transitions. While Hext=1.5 kOe is sufficient to prevent nanoparticle coating on opposing transitions, for weaker external fields, Hext~800-900 Oe, we have observed partial coating of opposing transitions. Since the external field magnitude controls the height where Hnet=0 above opposing transitions, as well as enhancing the magnetization of nanoparticles above aligned transitions, transitions with constructive field superposition can yield thicker nanoparticle layers than the zero external field case, while transitions which oppose the external field produce a thinner layer than the zero field case. We have achieved such multiple topographies in our external field coatings, suggesting potential for creating assemblies with varying nanoparticle layer thicknesses controlled by applying a spatially varying external magnetic field template during assembly. 3D Assembly: Controlling Interlayer Assembly We can employ external fields to further extend our technique and create two vertically-separated, horizontally-interleaved layers of nanoparticles, with the layers assembled in oppositely-directed fields and separated by a polymer layer. FIG. 4(A-B) show this process, with the left panel (A) demonstrating external field assembly at "positive" field transitions. After removing the ferrofluid, the layer is spin-coated with polymer, only instead of peeling the polymer, we expose the surface again to ferrofluid, this time in a "negative" field (right panel, B), and thus the particles assemble on "negative" field transitions. After this second coating, the film is further coated with a second layer of polymer and then peeled from the coupon. The dark field image in FIG. 4(A) shows alternating brighter and dimmer features. The dimmer interleaved features are the "negative" field transitions, which are still slightly coated at the intermediate external field used here, Hext=900 Oe. The dark field image in FIG. 4(B) (two layers of nanoparticles) shows bright nanoparticle lines at the locations in FIG. 4(A) that were dim and weakly coated. Thus FIG. 4A-B clearly display a horizontal single-transition width offset in the nanoparticles between the lower and upper layers, demonstrating the potential for nanomanufacturing 3D composites with both inter- and intra- layer control over the assembled topography and feature spacing.

Discussion and Conclusions

Control over field-gradient driven magnetophoresis is typically limited by random thermo-fluidic effects including particle diffusion and Brownian motion, as observed in nanoparticle magnetophoresis experiments conducted at significantly weaker field gradients. The boundary between diffusive and driven nanoparticle transport is often derived under the assumption that the nanoparticles are moving at their terminal velocity, i.e. the inertial term in Newton's 2nd law is presumed negligible. For recorded transitions at the medium surface, the field gradient changes strongly with height and is a maximum at the medium surface. Therefore, a nanoparticle trapped in the transition field experiences an ever-increasing acceleration with decreasing height and thus will not reach a terminal velocity. While diffusive effects may modify a nanoparticle's trajectory, given the repeatability of the coatings, these effects are perturbative instead of dominant in these large field gradients. Since the transitions effectively remove nanoparticles from the fluid at lower heights, a concentration gradient could be created thet enables diffusive transport (at large heights where the gradients are weaker) to drive nanoparticles toward the disk surface. Concentrating nanoparticles on a surface in the extreme gradient limit is clearly different than concentrating them via weaker field gradients in fluid [34, 22], and requires additional study. In particular, a new figure of merit for identifying transport regimes may be needed to properly explain the physics of the assembly process. Efforts are currently underway to understand how the total assembled magnetic moment experimentally determined via magnetometry depends on both coating time and nanoparticle concentration. Finally, additional studies are needed to fully understand changes in the polymer film after peeling and extend this technique for large area applications, for example, by adding a second layer of stiffer polymer on top of the first layer prior to peeling.

In conclusion, we demonstrate a nanomanufacturing proof-of-concept by transferring magnetic-field assembled nanoparticles to the surface of a polymer film and verifying that the pattern is maintained after peeling. We have successfully employed this technique to nanomanufacture a stand-alone all-nanoparticle diffraction grating. By extending our assembly process to include external control of in-layer feature topography, as well as bilayer assembly with precision vertical and horizontal spacing, we suggest that commercial magnetic recording offers a novel and practical approach for creating large-area nanomanufactured composite materials.

EXAMPLE 3

A nanomanufacturing process is generally provided for diffraction gratings from cobalt ferrite ($CoFe_2O_4$) nanoparticles that are first self-assembled onto magnetic disk drive substrates and are then transferred as assembled to stand-alone, polymer thin films (e.g., as described above).

Previously, our group has demonstrated a novel nanomanufacturing technology that employs magnetic recording to direct self-assembly of magnetic nanoparticles. Here we employ magnetic recording to generate patterns that yield diffraction gratings. Using magnetic recording to create nanoscale templates, we can direct self-assembly of magnetic nanoparticles onto disk drive magnetic media (i.e. the disks used in magnetic recording). Equally-spaced, oppositely-magnetized regions are recorded onto a 95 mm diameter longitudinal disk drive medium (disk) via magnetic recording with a conventional write/read head. The length of these regions are precisely controlled during the recording process to yield equal spacing lines patterned on the disk surface. Enormous magnetic field gradients (>4×106 T m-1 at 25 nm to 5000 T m-1 at 1 mm above the disk drive surface) exist at the junction (called a transition) between the oppositely recorded regions. These field gradients exert a force on colloidally suspended superparamagnetic nanoparticles, i.e., a ferrofluid deposited on the media. This spatially-localized magnetic force attracts the nanoparticles to these transitions, and by creating arrays of transitions over the disk surface, we precisely assemble nanoparticles into large-area patterned materials. Pattern sizes and shapes are controlled by magnetic recording, with the magnetic medium acting as a template for nanoparticle assembly that can be both reused and reprogrammed with different patterns. For the diffraction gratings we manufacture using the template, the lines lie parallel to the disk radius with the grating spacing along the disk circumference. Our gratings are written at a 28 mm radius, and over a 0.65×0.65 mm2 illuminated area [e.g. 0.65 mm Gaussian full width at half maximum(FWHM) of our HeNe laser beam], the saggita for a 0.65 mm long chord is 2 mm. Therefore, relative to a 0.65 mm wide band, the deviation of our grating from square along the circumferential direction is 0.3% and can be neglected. Moreover, we can also perform xy rectilinear recording using a contact write read tester. FIGS. 5(a)-5(d) show the entire process schematically.

Figure 5E:
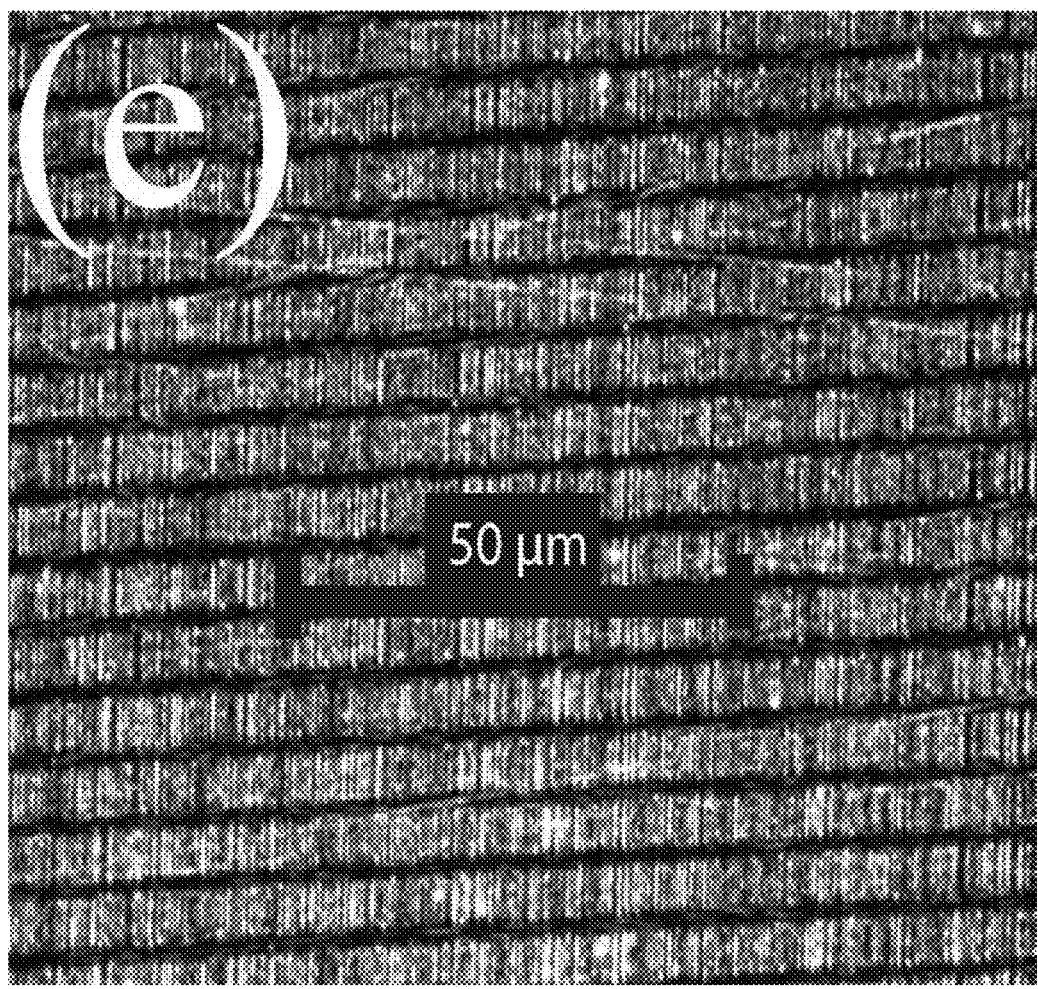

As shown in FIG. 5(a), magnetic recording media are diced into 12 mm diameter circular coupons. After cleaning a coupon, 0.5 mL of diluted ferrofluid (10-20 nm diameter cobalt ferrite nanoparticles with 10 mg/mL nanoparticle concentration) is pipetted onto the coupon. The nanoparticles suspended in the ferrofluid just above the coupon surface are magnetized by the transitions' fields, and are then attracted to the transition region ["T" in FIGS. 5(a)-5(c)], by the field gradient. The ferrofluid solution remains on the coupon for 60 minutes, and is then removed. Nanoparticles coat the transitions on the coupon [FIG. 5(b)]. Here we employ $CoFe_2O_4$ as opposed to $Fe_3O_4$ nanoparticles discussed above because the pattern formation process takes longer (60 minutes as opposed to 1 minute for $Fe_3O_4$ nanoparticles), making the process easier to control. A representative dark-field microscope image of the nanoparticle patterns assembled on the coupon is shown in FIG. 5(e). After imaging the assembled nanoparticles we spin-coat a liquid polymer solution onto the coupon surface [FIG. 5(c)]. The polymer (Diskcoat 4220 from General Chemical Corp., Brighton, Mich.) is diluted with DI water (Diskcoat:DI water=4:1) and spun at 2000 rpm for 20 s, and the resulting film is 1.1 mm thick as determined using both stylus and optical profilometry. Varying the ratio of Diskcoat to DI water enables different polymer film thicknesses. After curing the polymer thin film for 15 minutes in air at room temperature, the polymer-nanoparticle assembly is peeled from the coupon surface with adhesive tape [FIG. 5(d)]. This peeling transfers the nanoparticle patterns to the polymer film. The adhesive tape has a 5 mm diameter central hole, yielding a window of suspended film containing patterned nanoparticles [FIG. 5(f)]. FIG. 5(g) shows a dark-field image of the patterned nanoparticles as embedded in the suspended film after peeling. We optically measure grating spacing (d) using a 100× objective lens, and, assuming equal spacing for these features, multiple measurements of 50 mm patterned regions (L=50 mm) yield 742±12 nm. Similar measurements on the peeled patterns yield 750±12 nm. The 12 nm error bars (s) are obtained via $$\sigma = \frac{L\delta N}{N^2}$$

where N is the average groove number within the 50 mm patterned regions and d N is the standard deviation in N measurements. For peeled patterns, N=66.4 and d N=1.03. As no nanoparticles are observed on the coupon after peeling, and with the same pattern spacing after transfer within experimental error, this approach yields near-perfect transfer of the assembled grating from the coupon to the film.

FIG. 6 demonstrates operation of our nanomanufactured gratings in an optical spectrograph. A grating is mounted on a rotation stage with the lines of nanoparticles in the y-z plane [front view in FIG. 6(a)]. The rotation stage can orient the grating such that the nanoparticle lines are parallel to the z-axis. Diffraction spectra are obtained using the experimental geometry shown in FIG. 6(a), with light incident onto the grating surface at normal incidence. Four optical sources [HeNe gas laser (632 nm), green (532 nm) and blue (405 nm) diode lasers and a tungsten halogen bulb] are aligned with the x-axis for illuminating the grating identically at the origin (O). A photodetector is used to monitor the intensity of laser transmission. A charge-coupled device (CCD) line camera (LC) is mounted on a xy-translation stage. The LC incorporates a 3045 pixel CCD array (7 mm horizontal pixel size and 21.3 mm long in total) with 350-1100 nm spectral range. For all spectral measurements the pixel line array is parallel to the x-axis and vertically aligned to be in the same plane as the incident light.

Figure 6A:
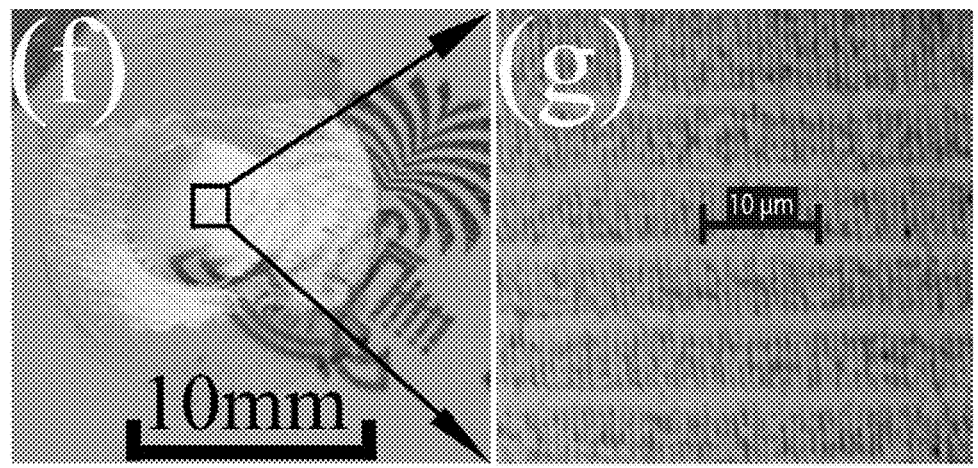
FIG. 6A-6C show spectral measurements and calibration of a nanomanufactured diffraction grating in reflection mode.
Figure 6A:
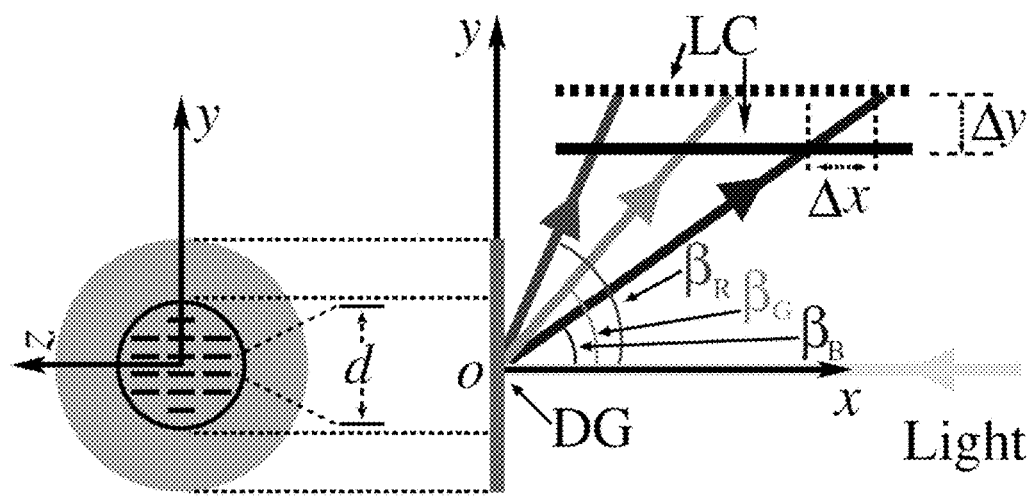
Figure 6B:
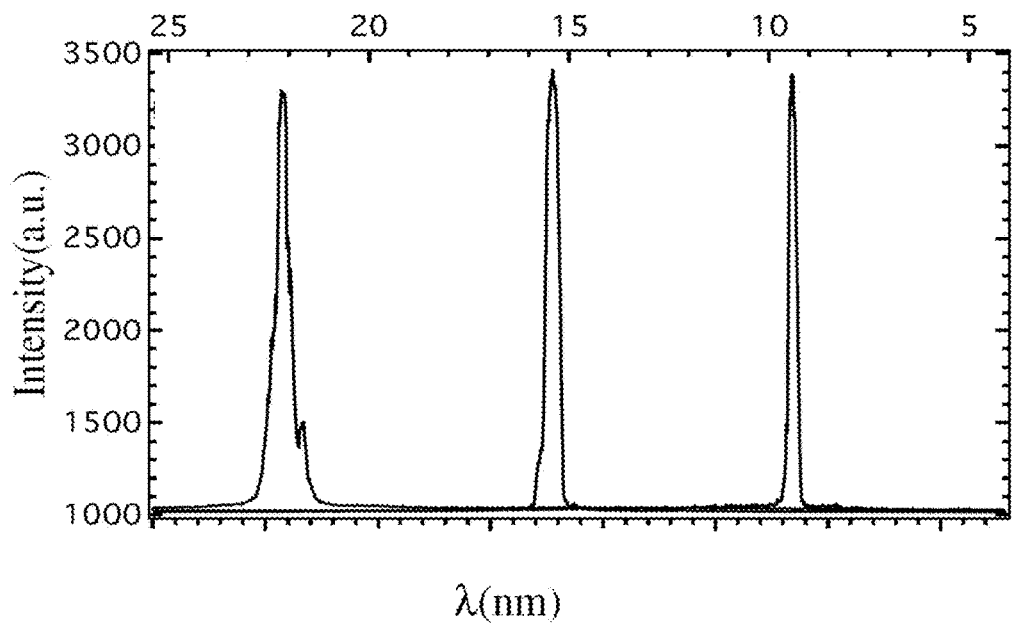

FIG. 6(b) shows representative first-order diffraction spectra for a 1.1 mm thick polymer grating for 405, 532, and 632 nm laser lines, which we employ for calibrating the spectrograph. The calibration is performed by finding the angle of diffraction for the three reference laser lines as follows. We translate the LC by a known Δy and record the corresponding peak position shift Δx. We perform this calculation for the three lines to determine absolute x and y positions of LC pixels. Both absolute and relative x and y LC positions are related to the angle of diffraction β, via $$\tan\beta = \frac{\Delta y}{\Delta x} = \frac{y}{x}.$$

Figure 6C:
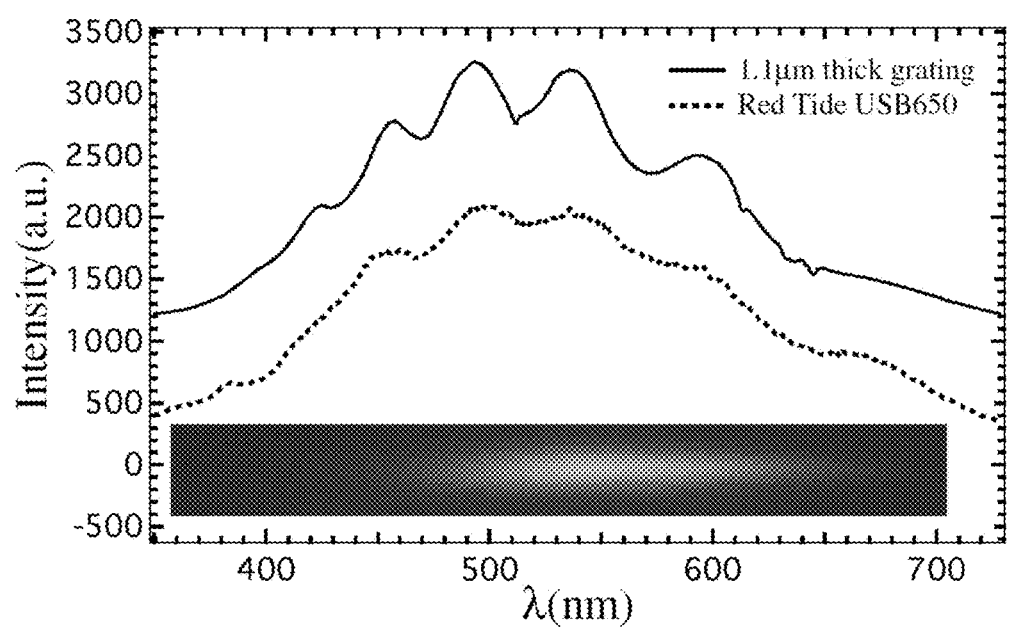

The diffraction angle is related to grating spacing and wavelength by the diffraction grating equation $$d(\sin \alpha + \sin \beta) = m\lambda$$

where α is the incident angle, =0 in our geometry, λ is the wavelength and m is the order number, =1. We fit λ as a function of β and obtain d=770±10 nm. This result agrees within error bars with the 50 mm scale bar measurements discussed above. Using y=13.7 mm and d=770 nm, Eq. (2) and Eq. (3) allow us to convert an arbitrary x-position on the LC into units of wavelength to generate the lower axis in FIGS. 2(b)-2(c). The error in this spectral calibration is 13 nm, which is calculated using the pixel positions that correspond to the 550 nm center wavelength of our detection window. This 13 nm error arises from combining the 10 nm uncertainty in our measurement of d with 7 mm and 12 mm uncertainties in LC pixel position and y-stage translation respectively. The solid line in FIG. 6(c) shows the diffraction spectrum for a tungsten-halogen bulb recorded with our spectrograph. We observe 5 peaks at 425 nm, 455 nm, 495 nm, 535 nm, and 595 nm. The inset to FIG. 6(c) shows a photograph of the tungsten-halogen spectrum displayed on a white card for reference. The diffraction spectrum for the tungsten-halogen bulb recorded with a commercial spectrometer (Ocean Optics, Red Tide USB650 with 2.0 nm optical resolution) is also shown [the dotted line in FIG. 6(c)] for comparison. The two spectra match closely, however the solid line peaks for the nanomanufactured grating are more prominent (2×).

The absolute efficiency of these nanomanufactured gratings measured with the HeNe laser (10 mW) is 0.00071±0.00002. Assuming a 750 nm period lamellar grating with 100 nm FWHM assembled nanoparticle feature size and 30 nm groove depth, and given the small ratio of feature height to wavelength 0.05, asymptotic theory predicts 0.0045 absolute efficiency at 633 nm for the Littrow geometry. While the measured efficiency is 6 times lower, our gratings are measured at normal incidence and are not true lamellar structures. By sputtering 20 nm of Au on a grating, we achieve an order of magnitude efficiency improvement, suggesting that further optimization of the fabrication process could yield better diffraction efficiency. Moreover, absolute efficiency can be enhanced by increasing the groove width relative to the grating period.

Concave Grating

Figure 7A:
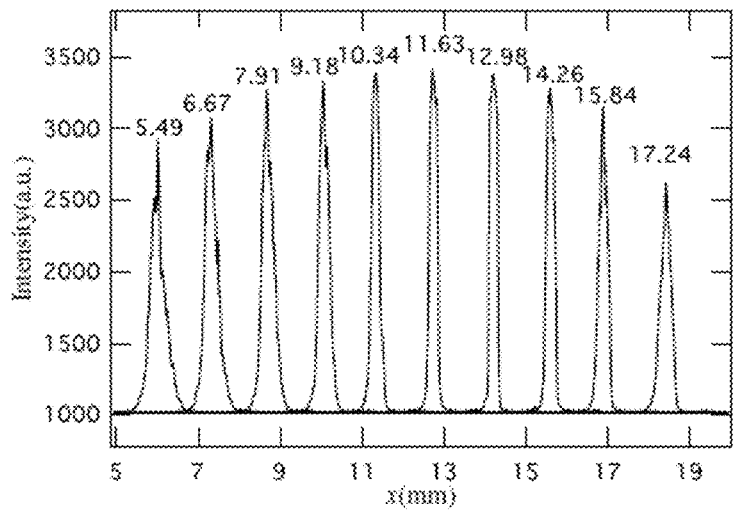
FIGS. 7A-7C shows curvature inherent in our nanomanufactured concave gratings.

While calibrating the spectra discussed above, we noticed that a y-translation also causes a change in spectral peak intensity and width. FIG. 7(a) shows a representative set of diffraction peaks on the LC during a series of y translations using the 532 nm laser. Starting at x=6 mm, the peak intensity first increases until x=12.7 mm and then decreases until x=18.5 mm. Similarly the spectral width decreases and then increases as x increases with the minimum peak width corresponding to the maximum intensity. FIG. 7(a) labels the corresponding y-position in millimeters above each peak. Changing peak intensity and width as a function of x and y lead to the hypothesis that the grating is focusing the spectrum, and that our gratings are not planar but concave. As the LC records a projection parallel to the incident beam and b remains the same regardless of LC position, the peak center position is accurately detected by the LC. Therefore, we can precisely obtain the spectral focus as a function of x and y by recording spectral profiles while translating the y stage. This measurement configuration is known as the Wadsworth geometry.

Figure 7B:
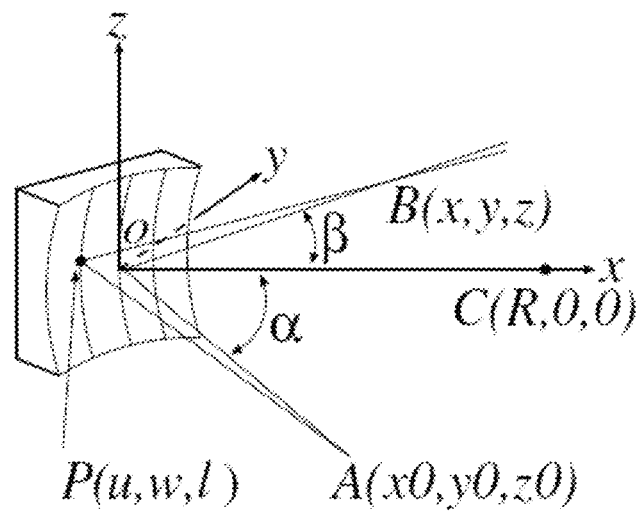

FIG. 7(b) shows a concave grating geometry, where the origin O of the Cartesian system is at the center of the grating, the x-axis is the grating normal and the z-axis is parallel to the grating grooves. As for the plane grating, the light path difference for neighboring grooves must be an integral multiple of 1 so that the diffracted waves are in phase. The light path difference for any two grooves of the concave grating separated by w is (w/d)ml. Thus for light from point A(x0,y0, z0) with incident angle a on any point P(u,w, 1) of the concave grating, where w/d is an integral number, forms a spectral image at point B(x,y, z) with diffraction angle b, light has to satisfy the light path function (F)

$$F = <AP> + <PB> + \frac{mw\lambda}{d}$$

where<AP>(<PB>) is the distance between points A and P (P and B). According to Fermat's principle of least time, point B is located such that F is an extreme for any point, P, and all extremes for focusing light from A at B must be equal. Thus the condition for focusing light that diffracts from grating points along w [i.e., y direction in FIG. 7(b)] is $$\frac{\partial F}{\partial w} = 0.$$

Since the LC pixel array records spectra only along the x-axis, we expand Eq. (4) in a series with respect to w. We insert Eq. (4) into Eq. (5) using a=0 and<AP>=¥ (Wadsworth geometry). Ignoring orders above first in w,) we find y as a function of x and for convenience this function is expressed in terms of y and b using Eq. (2)

$$y = R\frac{\sin\beta\cos^2\beta}{1+\cos\beta}$$

where R is the radius of curvature of the grating.

Figure 7C:
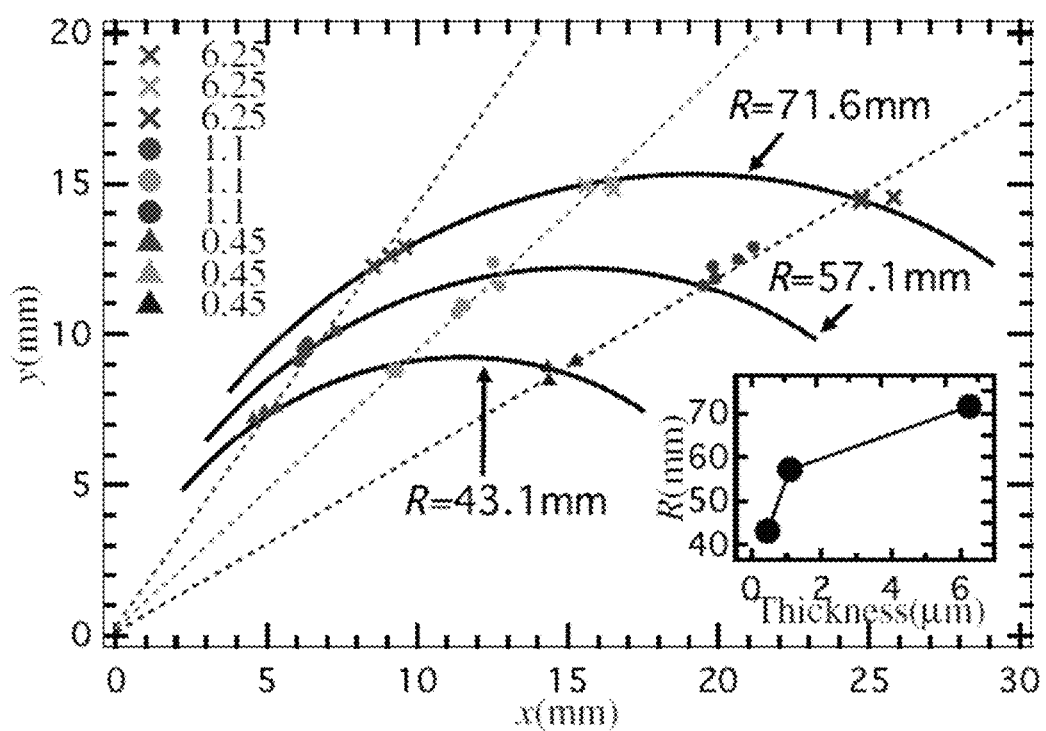

We nanomanufactured 11 gratings, 3 are 0.45 mm thick, 5 are 1.1 mm thick, and 3 are 6.25 mm thick. Their focal positions measured with 632 nm, 532 nm, and 405 nm lasers are shown in FIG. 7(c) as triangles, dots, and crosses for each thickness respectively. We then fit these data with Eq. (6) and find R=43.1±0.7 mm, 57.1±1 mm, and 71.6±0.8 mm for 0.45 mm, 1.1 mm, and 6.25 mm thick gratings respectively [solid lines in FIG. 7(c)]. We observe thicker films have larger radii of curvature, meaning the films are flatter, while thinner films have smaller radii of curvature, meaning the films are more curved [inset to FIG. 7(c)]. The focal positions of the images diffracted by these three different curvatures as indicated in FIG. 7(c) show nearly equal diffraction angles [b in Eq. (3)] for each laser. This result further confirms that our gratings have nearly identical spacings for differing polymer film curvatures [dotted lines drawn along a constant angle in FIG. 7(c)]. Further, the zeroth-order term of an expansion of F with respect to w leads to the diffraction grating equation [i.e. Eq. (3)], demonstrating that grating curvature does not affect the diffraction angle, only the focused spectrum position. The nearly identical spacings and<2% variations in R measurements show these nanomanufactured gratings are highly reproducible. These measurements demonstrate that not only does our nanomanufacturing process create repeatable concave gratings, but also allows control of the radius of curvature. This inherent curvature eliminates a second curved mirror that is found in the Czerny-Turner [26], Ebert-Fastie [27], and Littrow monochromators.

The spectral bandpass ($B_S$) of our concave grating spectroscopic system in the Wadsworth geometry is imaging limited, since there is no entrance slit and the line camera pixel size is 7 mm, $$B_S = P_F W_S$$

where $P_F$ and $W_S$ are the plate factor for concave gratings and the entrance slit width respectively. Using 0.65 mm for our entrance slit, i.e. $W_S$=0.65 mm, and with 2×2 mm² grating size, i.e. much smaller than R, we employ the Rowland circle concave grating $P_F$ with an extra factor of sinb to account for the orientation of the LC pixels parallel to the x-axis. Thus we have $$B_S = \frac{dW_S \cos\beta \sin\beta}{mR}.$$

For 57.1 mm radius gratings, Eq. (8) predicts $B_S$=4.1 nm for the HeNe laser, and the measured FWHM of the HeNe diffraction peak is 4.2 nm, i.e. suggesting our measured resolution agrees closely with that predicted for our particular imaging geometry. The measured and predicted resolutions agree closely for all three radii of curvature.

Repeatability of Tungsten-Halogen Spectra

Figure 8A:
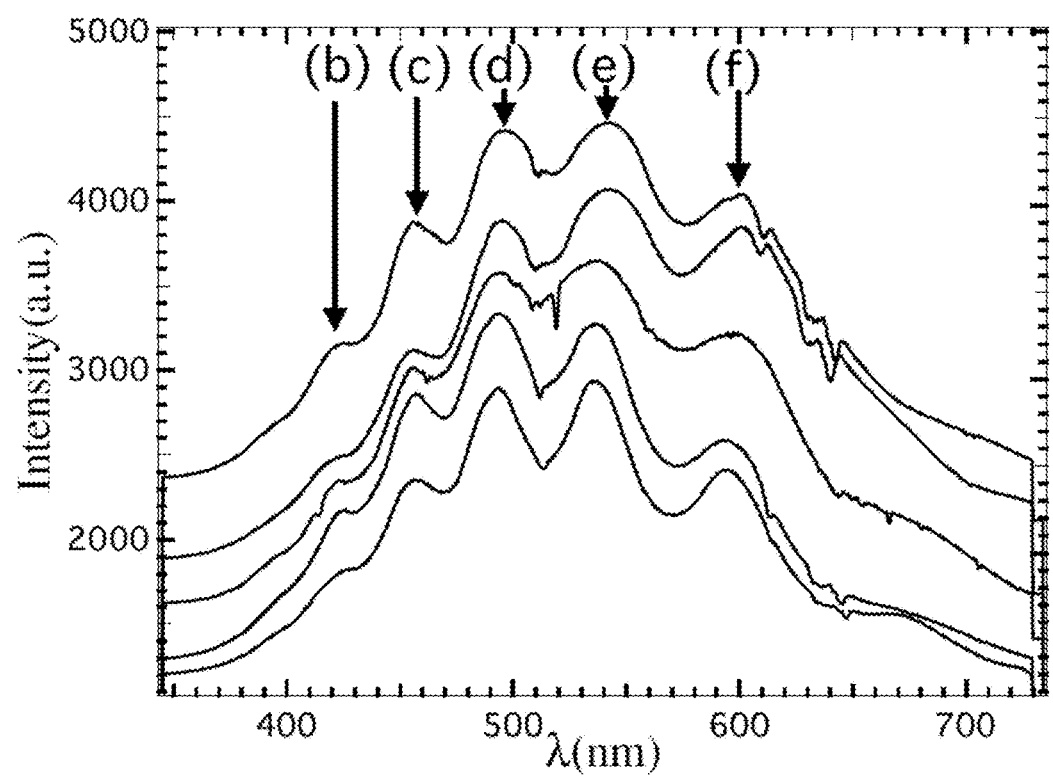
FIG. 8A-8F show the repeatability of tungsten-halogen spectra.
Figure 8B:
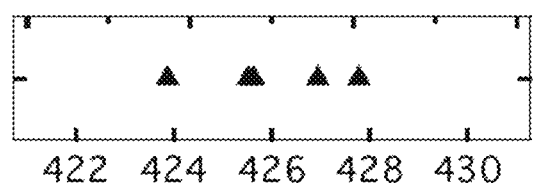
Figure 8C:
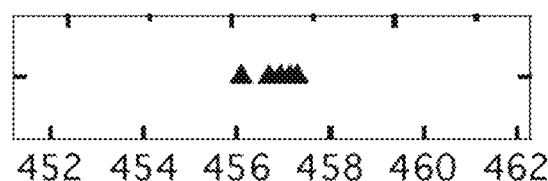
Figure 8D:
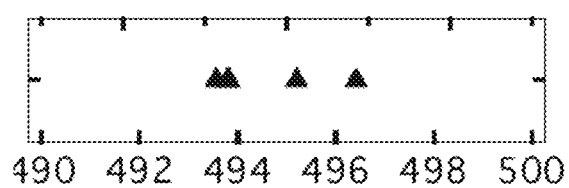
Figure 8E:
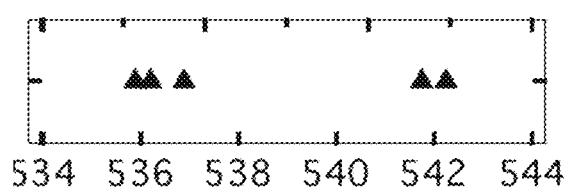
Figure 8F:
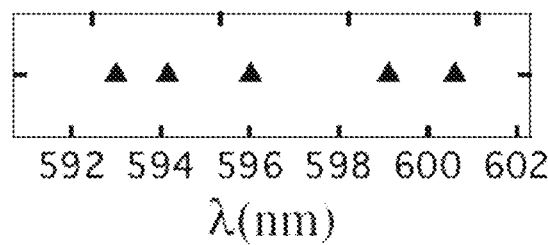

FIG. 8(a) shows tungsten-halogen spectra for 5 nominally identical 1.1 μm thick polymer film gratings. The spectra are plotted with a vertical offset for clarity. Concave gratings focus different wavelength light at different y positions, and therefore spectra recorded on the LC are not linearly scaled with respect to y. For the 532 nm laser the diffraction foci for these 5 gratings are slightly different, and therefore we record tungsten-halogen spectra with the LC located at the average position, y=11.33 mm. Each spectrum has 5 peaks, and we fit each peak's position using the Lorentzian function, as displayed in FIGS. 8(b)-8(f). FIG. 8(b) shows that the first peak of 5 identical gratings occurs at nearly the same spectral position with <10 nm variation. FIGS. 8(c)-8(f) show almost same behavior as FIG. 8(b) with 3 nm average standard deviation. Thus multiple grating studies both for differing radii of curvature and of tungsten-halogen spectra together demonstrate that our nanomanufacturing process is highly repeatable.

Conclusion

We have nanomanufactured an all-nanoparticle diffraction grating embedded in a flexible, curved, polymer thin film and demonstrated its performance in a calibrated optical spectrograph. Appropriate entrance slits could be incorporated to improve spectral resolution, larger gratings could be illuminated, and Rowland circle mounts could be used to reduce aberrations in the diffracted spectrum. This approach to programmable self-assembly is not limited in terms of how large the line-spacing can be, since larger magnetic patterns can easily be recorded. The minimum line spacing depends on the smallest magnetic pattern that the recording system can support, which is 10-30 nm for areal densities from 100 Gbit/in²-1 Tbit/in², and will continue to be reduced as magnetic recording technology advances. In principle, grating size is limited by mechanical positioning and the availability of sufficiently large magnetic media materials, however the size and quality of the grating transferred will depend on the polymer properties, and limits to the peeling process. Here different polymers with suitable properties could be employed to potentially create large-scale gratings. Different magnetic media could be used to increase grating thickness, and importantly, different species of nanoparticles with more uniformity and narrow polydispersity could allow better control of groove microstructure, and potentially allow one to create blazed gratings. Future work will include determining how grating efficiency, resolving power, and repeatability depend on parameters of the coating process (e.g. coating time) and nanoparticle magnetic properties. Quantitative measurements of grating scatter and stray light emission will help elucidate the factors that impact absolute efficiency. By combining the unique attributes of nanomaterials with large area reprogrammable patterning, this approach could yield more cost-effective and sustainable materials for optical applications.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

It is to be understood that the use of "comprising" in conjunction with the compositions described herein specifically discloses and includes the embodiments wherein the compositions "consist essentially of" the named components (i.e., contain the named components and no other components that significantly adversely affect the basic and novel features disclosed), and embodiments wherein the compositions "consist of" the named components (i.e., contain only the named components except for contaminants which are naturally and inevitably present in each of the named components).

What is claimed:

1. A method for magnetic recording, comprising:
   depositing a solution onto a surface of a magnetic disc medium, the magnetic disc medium comprising magnetic field gradients near the surface, the solution comprising a plurality of magnetic nanoparticles, the magnetic nanoparticles self-assembling upon the deposition into a pattern on the disc, the magnetic field gradients near the surface of the magnetic disc medium determining the pattern of the magnetic nanoparticles;
   applying a uniform external magnetic field to the magnetic disc medium during nanoparticle self-assembly;
   applying a polymer composition onto the magnetic nanoparticles;
   curing the polymer composition to form a polymer film on the disc, wherein the plurality of magnetic nanoparticles are immobilized in the pattern within the polymer film upon curing to form a diffraction grating; and
   removing the polymer film containing the plurality of magnetic nanoparticles in the pattern, wherein the polymer film defines a curvature, wherein the diffraction grating is concave.

2. The method as in claim 1, wherein the magnetic nanoparticles comprise $Fe_3O_4$ nanoparticles or cobalt ferrite nanoparticles.

3. The method as in claim 1, wherein the polymer is applied via a spin-coating process with a liquid polymer composition.

4. The method as in claim 1, wherein the polymer film is removed via a peeling process using an adhesive tape.

5. The method as in claim 1, further comprising washing the magnetic nanoparticles with a phosphate buffer solution following the self-assembly of the magnetic nanoparticles on the surface.

6. The method as in claim 1, wherein the polymer film as a thickness that is greater than 200 nm.

7. The method as in claim 1, wherein the polymer film is transparent.

8. The method of claim 1, further comprising:
after curing the polymer composition to form the polymer film but before removing the polymer film from the disc,
assembling a second plurality of nanoparticles into a second pattern over the cured polymer film on the disc;
applying a second polymer composition onto the second pattern of nanoparticles; and
curing the second polymer composition to form a second polymer film on the underlying polymer film on the disc, wherein the second plurality of nanoparticles are immobilized in the second pattern within the second polymer film upon curing.

9. The method of claim 8, further comprising:
after curing the second polymer composition to form the second polymer film but before removing the polymer film from the disc,
assembling a third plurality of nanoparticles into a third pattern over the cured second polymer film on the disc;
applying a third polymer composition onto the third pattern of nanoparticles; and
curing the third polymer composition to form a third polymer film on the underlying second polymer film, wherein the third plurality of nanoparticles are immobilized in the third pattern within the third polymer film upon curing.

10. The method as in claim 1, wherein the nanoparticles comprise cobalt ferrite nanoparticles having an average diameter of 10 nm to 20 nm.

11. The method as in claim 1, wherein the polymer film is removed via a peeling process using an adhesive tape defining a hole therein.

12. The method as in claim 11, wherein, upon peeling, the polymer film containing the plurality of nanoparticles in the pattern is suspended within the hole.

13. The method as in claim 1, wherein the magnetic nanoparticles comprise superparamagnetic particles.

14. The method as in claim 1, the magnetic disc medium comprising a magnetization of about 450 kA/m.

15. The method as in claim 1, further comprising prior to depositing the solution onto the surface of the magnetic disc medium, magnetically recording a transition pattern into the magnetic disc medium.

16. The method as in claim 1, the magnetic nanoparticles comprising an electrostatically charged ligand on a surface of the nanoparticles.

* * * * *

UNITED STATES PATENT AND TRADEMARK OFFICE
CERTIFICATE OF CORRECTION

Page 1 of 1

PATENT NO. : 10,381,035 B2
APPLICATION NO. : 14/251889
DATED : August 13, 2019
INVENTOR(S) : Thomas M. Crawford, Longfei Ye and Jason Ryan Henderson It is certified that error appears in the above-identified patent and that said Letters Patent is hereby corrected as shown below:

In the Specification

The following statement should be added after the "PRIORITY INFORMATION" paragraph and before the "BACKGROUND" paragraph:
FEDERAL RESEARCH STATEMENT
This invention was made with Government support under Grant No. 0700458, awarded by the National Science Foundation. The Government has certain rights in the invention.

In the Claims

Column 17, Line 5, Claim 6, the claim currently reads: "The method as in claim 1, wherein the polymer film as a thickness that is greater than 200 nm."

Should read: "The method as in claim 1, wherein the polymer film has a thickness that is greater than 200 nm."

Signed and Sealed this
Twenty-second Day of October, 2019

Andrei Iancu
*Director of the United States Patent and Trademark Office*